United States Patent
Kim et al.

(10) Patent No.: US 9,442,743 B2
(45) Date of Patent: Sep. 13, 2016

(54) MOBILE TERMINAL

(75) Inventors: Seho Kim, Seoul (KR); Youngho Lim, Seoul (KR); Kwangil Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 13/408,396

(22) Filed: Feb. 29, 2012

(65) Prior Publication Data

US 2013/0027364 A1 Jan. 31, 2013

(30) Foreign Application Priority Data

Jul. 28, 2011 (KR) .................. 10-2011-0074978

(51) Int. Cl.
G09G 5/00 (2006.01)
G06F 9/44 (2006.01)
G06F 1/16 (2006.01)
G06F 3/0488 (2013.01)

(52) U.S. Cl.
CPC ........... *G06F 9/4443* (2013.01); *G06F 1/1616* (2013.01); *G06F 1/1647* (2013.01); *G06F 3/04883* (2013.01); *G06F 2200/1614* (2013.01)

(58) Field of Classification Search
None
See application file for complete search history.

(56) References Cited

U.S. PATENT DOCUMENTS

| | | | | |
|---|---|---|---|---|
| 2005/0149933 A1* | 7/2005 | Saito | ................ | G06F 9/4843 718/100 |
| 2006/0010314 A1 | 1/2006 | Xu | | |
| 2006/0183505 A1* | 8/2006 | Willrich | ................ | G06F 1/1616 455/566 |
| 2008/0010314 A1* | 1/2008 | Frieden | ................ | G06F 17/3061 |
| 2009/0183186 A1* | 7/2009 | Murtagh | ................ | G06F 9/4443 719/329 |
| 2009/0187848 A1* | 7/2009 | Murtagh | ................ | G06F 9/4443 715/781 |
| 2010/0064245 A1* | 3/2010 | Smith | ................ | G06F 3/038 715/778 |
| 2011/0072435 A1* | 3/2011 | Yasutake | ................ | G06F 9/4881 718/103 |
| 2011/0302495 A1* | 12/2011 | Pinto | ................ | G06F 1/1694 715/733 |

FOREIGN PATENT DOCUMENTS

CN 102073375 A 5/2011

* cited by examiner

*Primary Examiner* — Seokyun Moon
*Assistant Examiner* — Douglas M Wilson
(74) *Attorney, Agent, or Firm* — Birch, Stewart, Kolasch & Birch, LLP

(57) ABSTRACT

A mobile terminal including a storage unit in which a first operating system (OS) and a second OS are loaded; a first display allocated to the loaded first OS and a second display allocated to the loaded second OS; and a controller configured to receive an indication signal indicating a second OS related event has occurred on the mobile terminal, and to selectively execute a second operation corresponding to the second OS related event using the first OS and allocate at least a portion of the first display to an output of the executing second operation.

13 Claims, 33 Drawing Sheets

FIG. 3
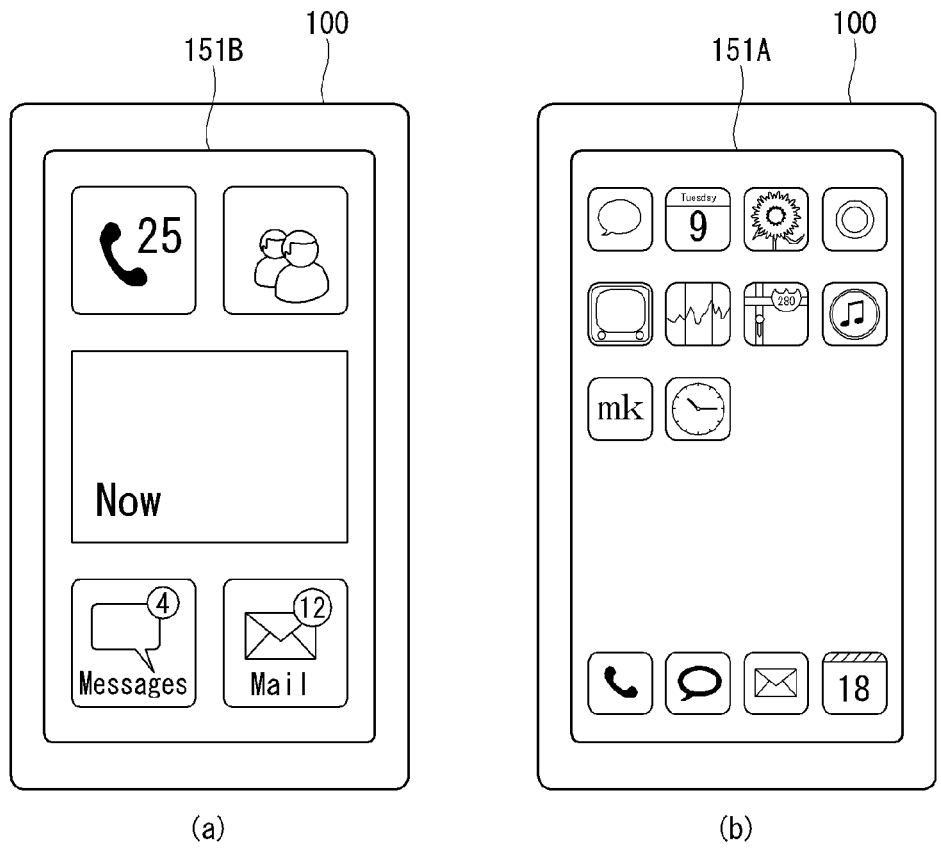
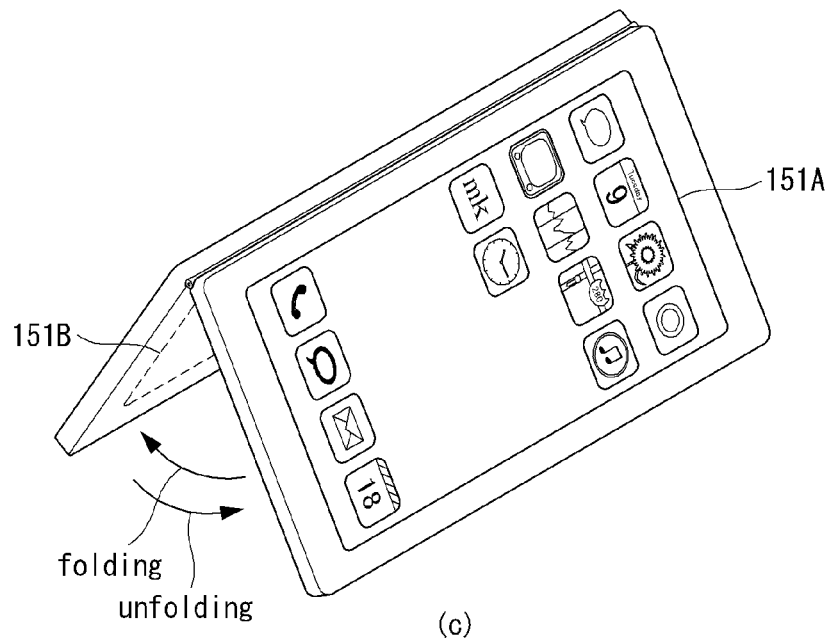

FIG. 7
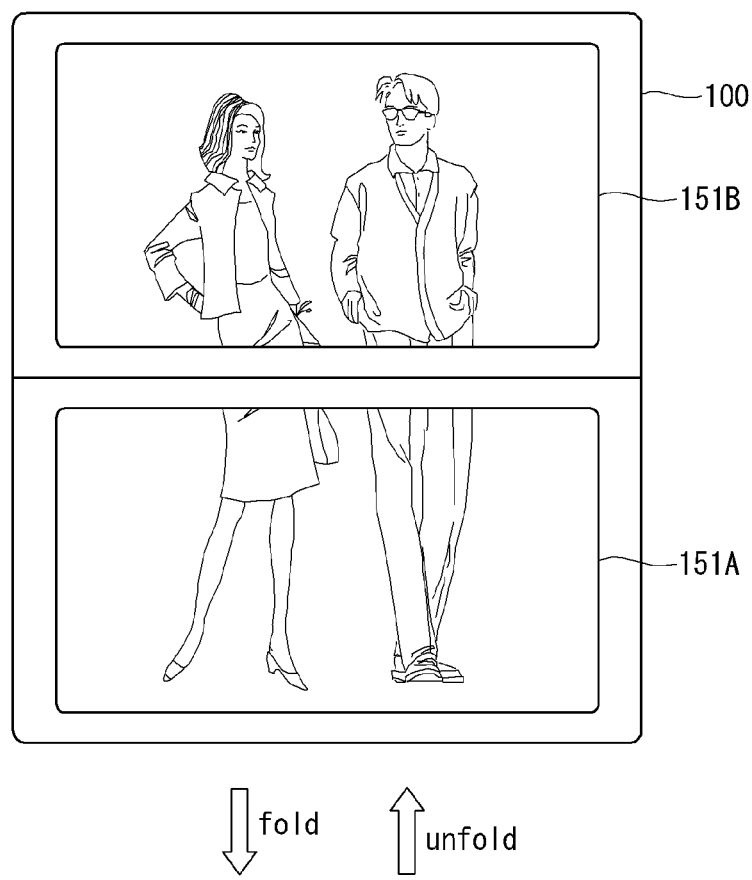
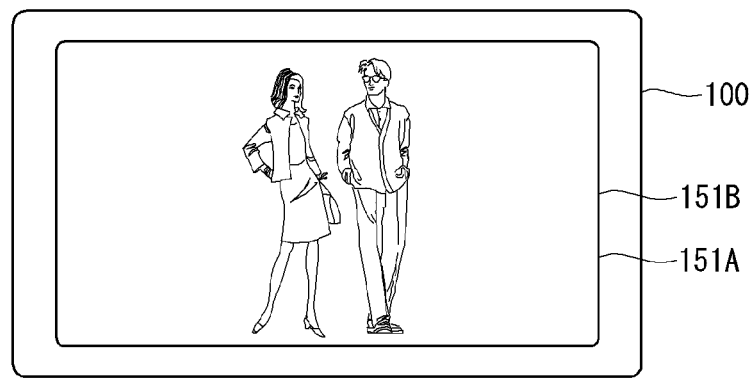

FIG. 11
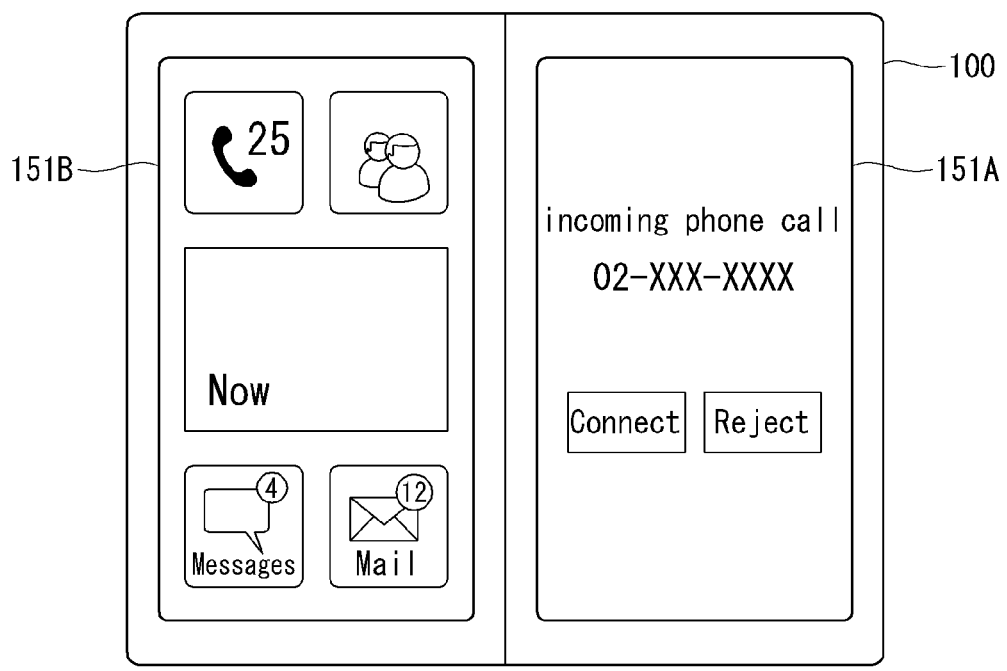
(a)
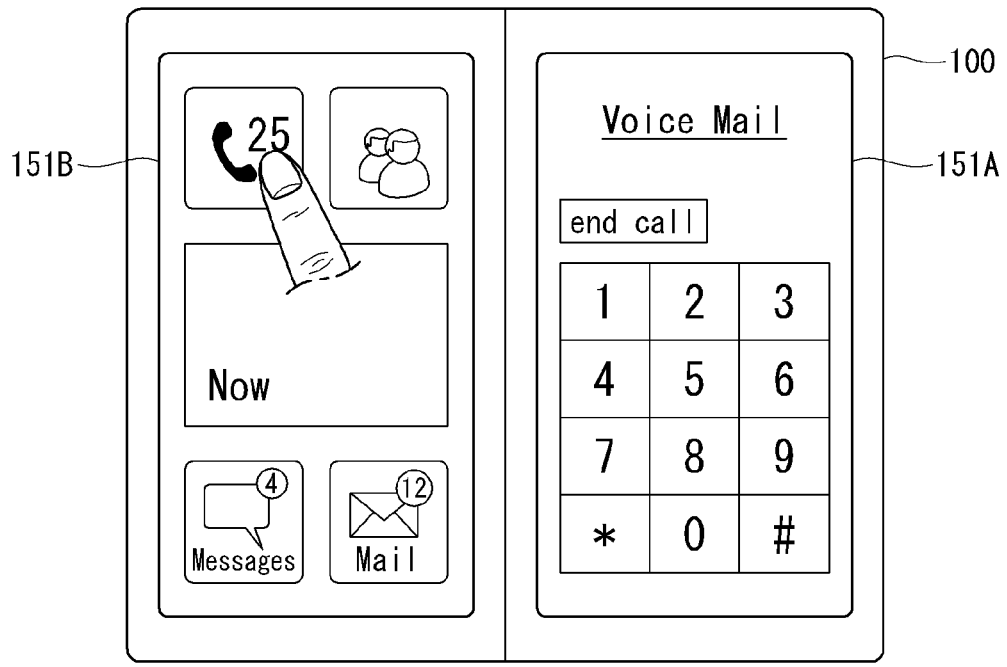
(b)

FIG. 12
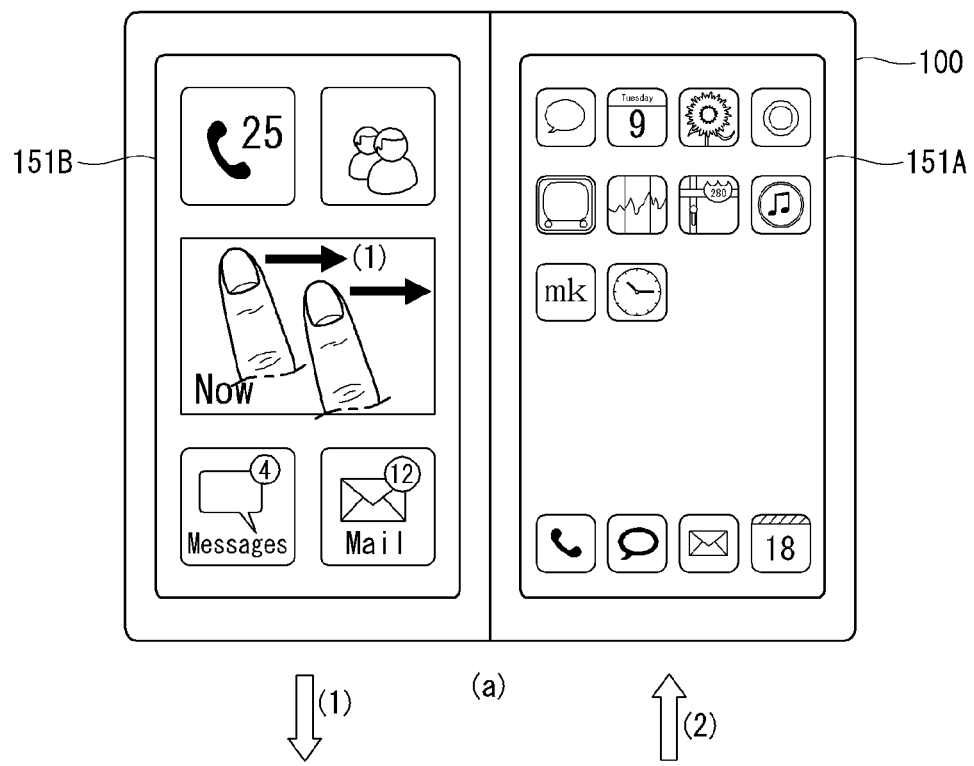
(a)
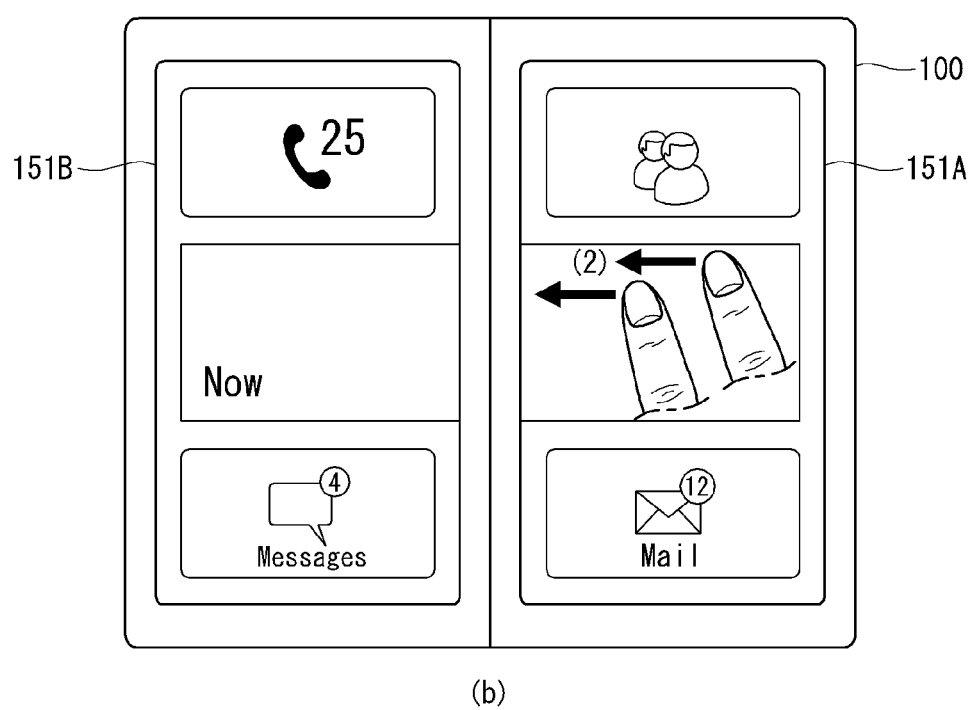
(b)

FIG. 17
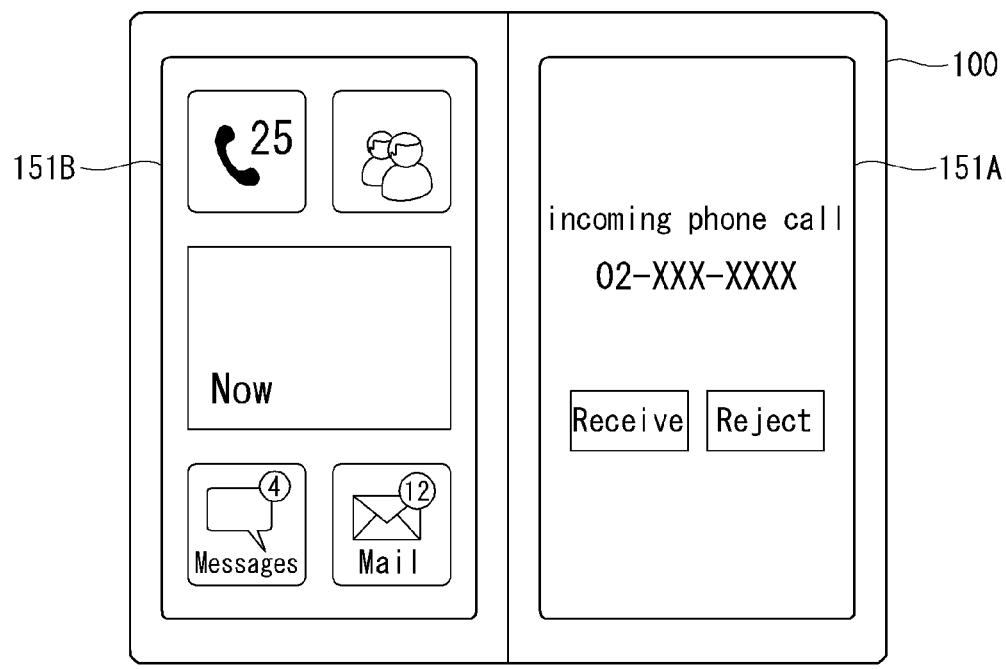
Execution result of memo operation for iOS
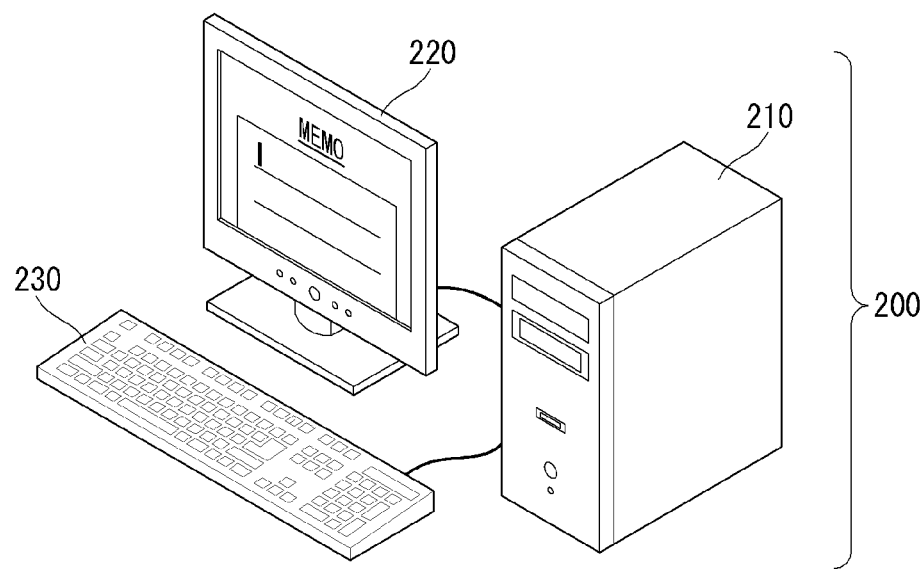

FIG. 18
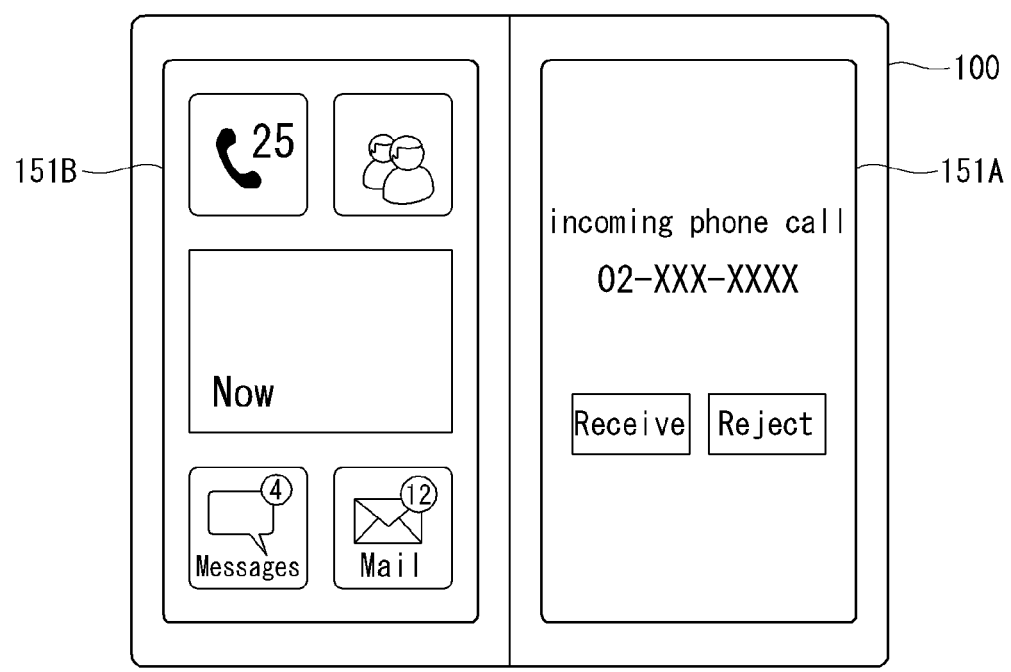
⇓ Execution result of memo operation for iOS
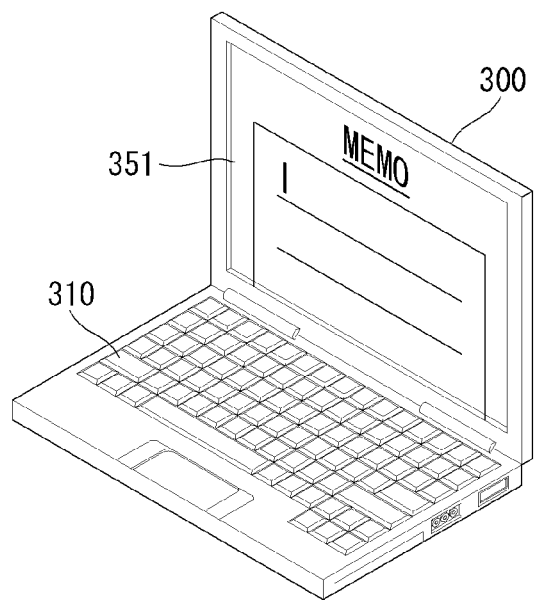

FIG. 19
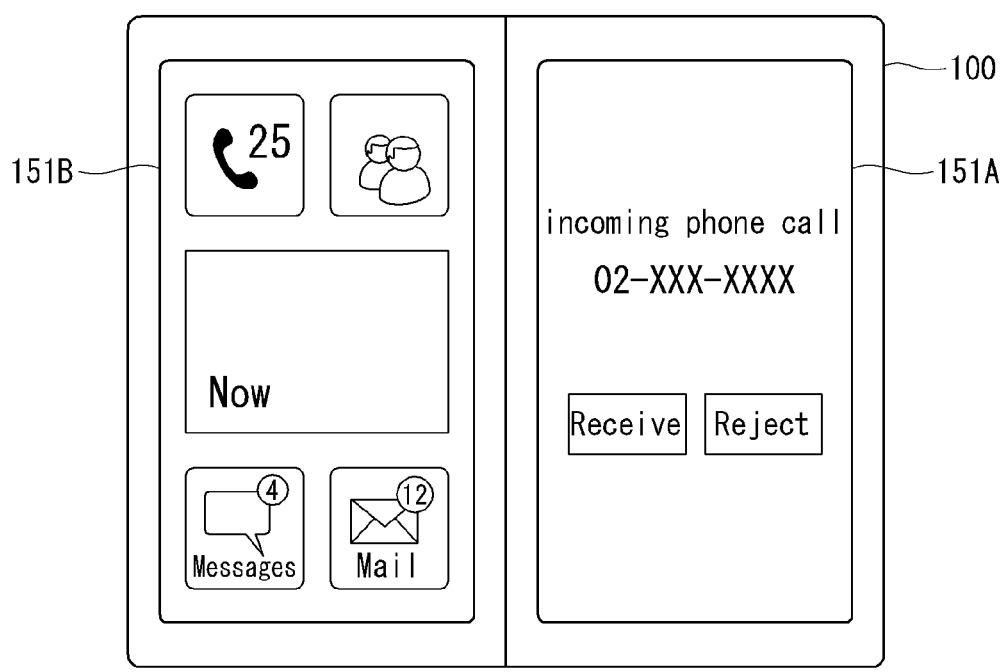
⇩ Execution result of memo operation for iOS
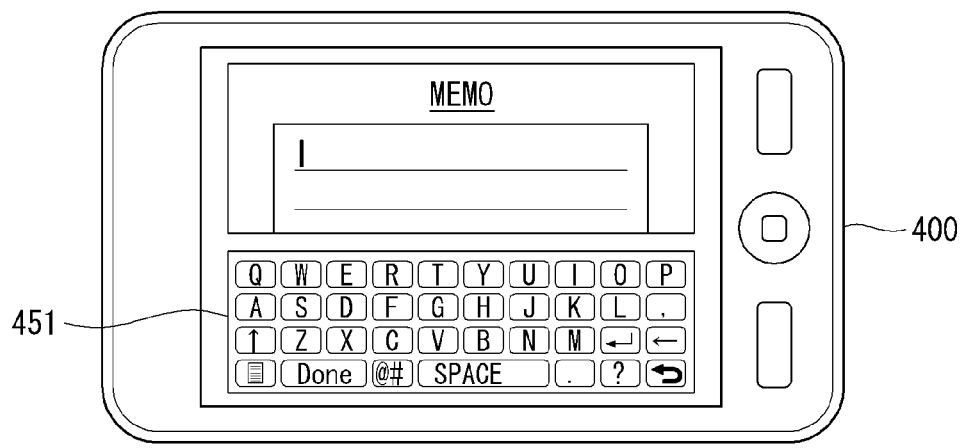

FIG. 22
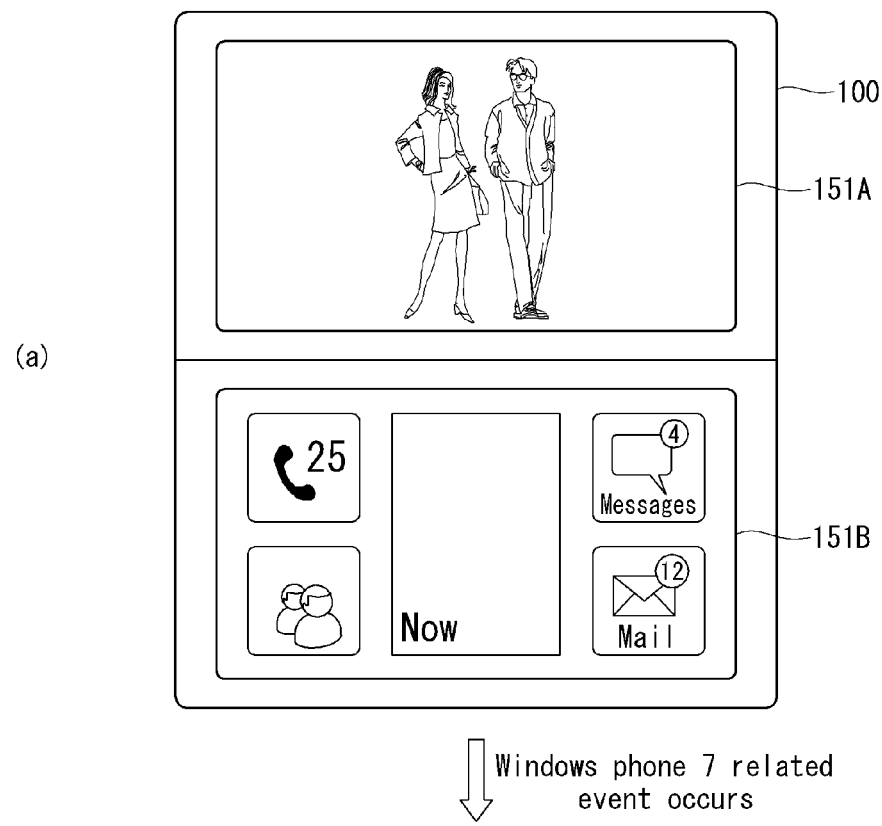
(a)
Windows phone 7 related event occurs
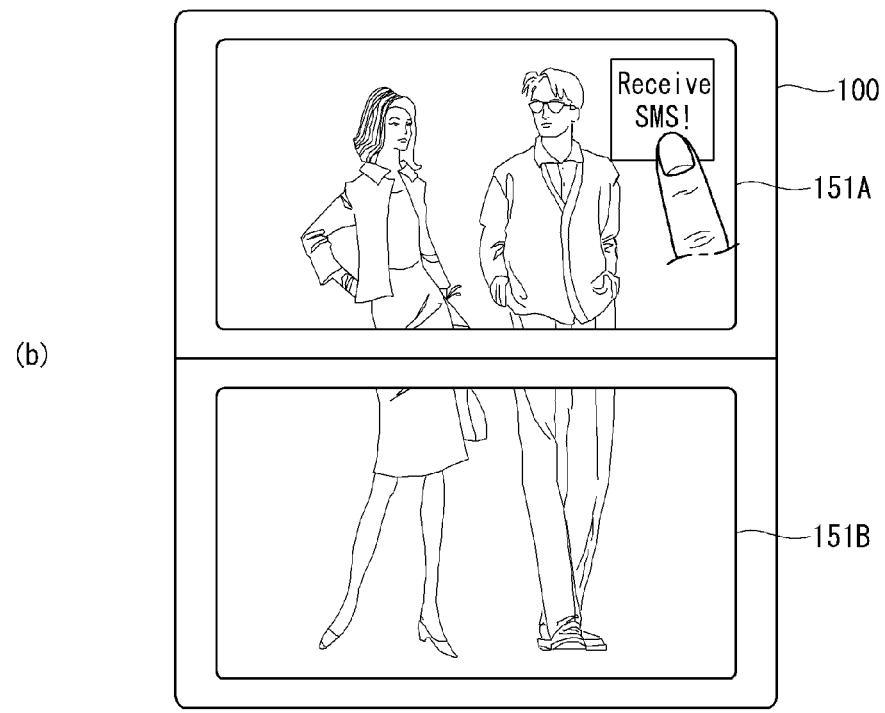
(b)

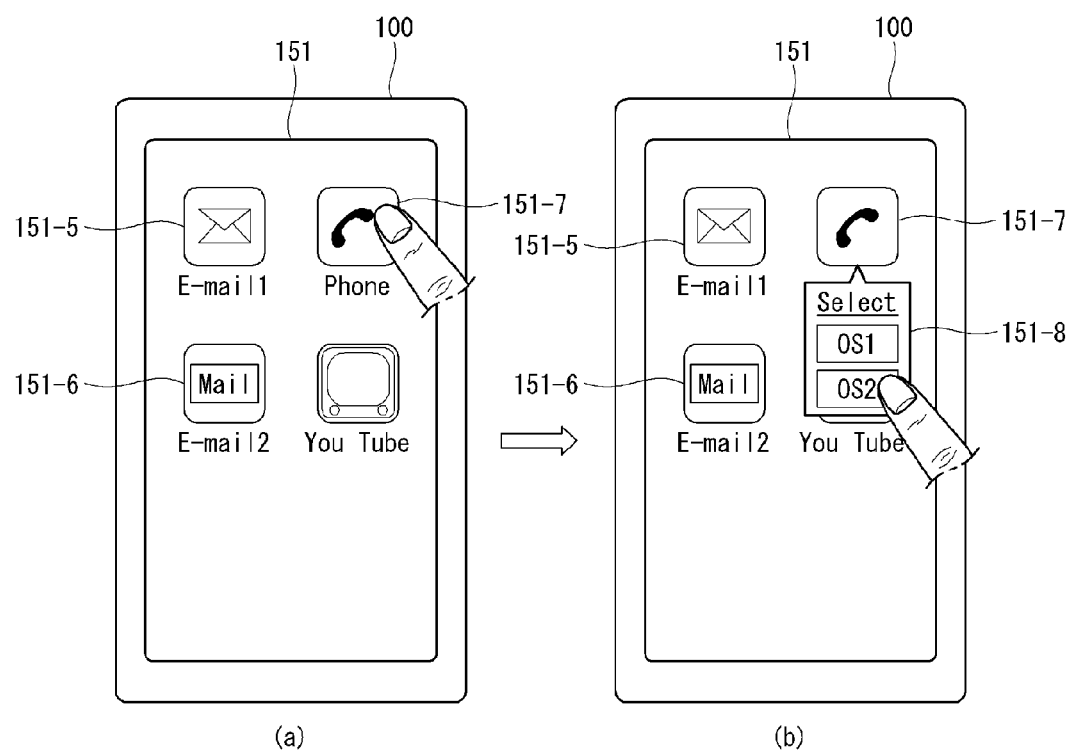

MOBILE TERMINAL

CROSS-REFERENCE TO RELATED APPLICATIONS

This application claims the benefit of Korean Patent Application No. 10-2011-0074978 filed on Jul. 28, 2011, and which is hereby incorporated by reference.

BACKGROUND OF THE INVENTION

1. Field of the Invention

The present invention relates to a mobile terminal and corresponding method for handling events occurring on the mobile terminal including multiple operating systems.

2. Description of the Related Art

Terminals such as a personal computer (PC), a laptop computer, a mobile terminal, and a smart phone now function as a multimedia player having complex functions such as photographing of a picture or a moving picture, reproduction of music or a moving picture file, game playing, reception of broadcasts, etc. However, the menu structure related to performing different operations on the terminal have also become complex and difficult to use in a convenient manner.

SUMMARY OF THE INVENTION

Accordingly, one object of the present invention is to address the above-noted and other problems with the related art.

Another object of the present invention is to provide a mobile terminal and corresponding method for handling an event related to a specific OS occurring in a multi-OS and multi-display mobile terminal by allocating at least a portion of a display allocated to other OSs to an output of an execution result of the operation related to the occurred event.

Yet another object of the present invention is to provide a multi-OS and a multi-display mobile terminal that outputs an execution result of operation in which another OS is executing through an external device, when an event related to a specific OS occurs.

Still another object of the present invention is to provide a multi-OS and a multi-display mobile terminal that allocates at least a portion of a display allocated to a specific OS to an output of an execution result of the operation in which another OS is executing, when an event related to a specific OS occurs.

Another object of the present invention is to provide a multi-OS and a multi-display mobile terminal that outputs an executing result of operation in which a specific OS is executing through an external device, When an event related to a specific OS occurs.

Thus, a mobile terminal according to an embodiment of the present invention can enable applications installed in different OSs and having the same function to share related information.

To achieve these and other advantages and in accordance with the purpose of the present invention, as embodied and broadly described herein, the present invention provides in one aspect a mobile terminal including a storage unit in which a first operating system (OS) and a second OS are loaded; a first display allocated to the loaded first OS and a second display allocated to the loaded second OS; and a controller configured to receive an indication signal indicating a second OS related event has occurred on the mobile terminal, and to selectively execute a second operation corresponding to the second OS related event using the first OS and allocate at least a portion of the first display to an output of the executing second operation.

In another aspect, the present invention provides a mobile terminal including a communication unit configured to form a communication network with an external device; a storage unit in which a first OS and a second OS are loaded; and a controller configured to receive an indication signal indicating a second OS related event has occurred on the mobile terminal, to output an execution result of a first operation operating in the first OS through the external device and to display an output of a second operation corresponding to the second OS related event in a display portion allocated to the first OS.

In still another aspect, the present invention provides a mobile terminal including a storage unit in which a first OS and a second OS are loaded; a first display allocated to the first OS and a second display allocated to the second OS; and a controller configured to execute a first operation using the first OS and display an output of the executing first operation only on the first display, to receive an indication signal indicating a second OS related event has occurred on the mobile terminal, to split the displaying of the output of the executing first application on the first display to both of the first and second displays, and to output an execution result of a second operation corresponding to the second OS related event to first or second displays.

In still another aspect, the present invention provides a mobile terminal including a communication unit configured to form a communication network with an external device; a storage unit in which a first OS and a second OS are loaded; and a controller configured to receive an indication signal indicating a second OS related event has occurred on the mobile terminal, and to output an execution result of a second operation operating in the second OS through the external device based on a type of at least one of the first operation executing on the first OS and the second operation.

In yet another aspect, the present invention provides a mobile terminal including a storage unit in which a first OS and a second OS are loaded; and a controller configured to share information related to a first application for the first OS with a second application for the second OS for performing the same function as that of the first application.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 3 illustrates one activated display when a mobile terminal according to an embodiment of the present invention is folded;

FIG. 7 illustrates a state change of a display according to whether folding of a mobile terminal according to an embodiment of the present invention including a transparent dual-display;

FIGS. 10 and 11 illustrate a state change of a display of a mobile terminal according to an embodiment of the present invention when a call related event related to a second OS occurs according to the user interfacing method shown in FIG. 9;

FIG. 12 illustrate a state change of a display of a mobile terminal according to an embodiment of the present invention when a touch reception event related to a second OS occurs according to the user interfacing method shown in FIG. 9;

FIGS. 17 to 19 illustrate examples of outputting an execution result of operation in which a first OS is executing through an external device when a call reception event related to a second OS occurs according to the user interfacing method shown in FIG. 16;

FIGS. 21 and 22 illustrate a state change of a display of a mobile terminal according to an embodiment of the present invention according to the user interfacing method shown in FIG. 20;

FIG. 33 illustrates another example of a user interfacing method of giving an option to applications for performing the same function in different OSs in a mobile terminal according to an embodiment of the present invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
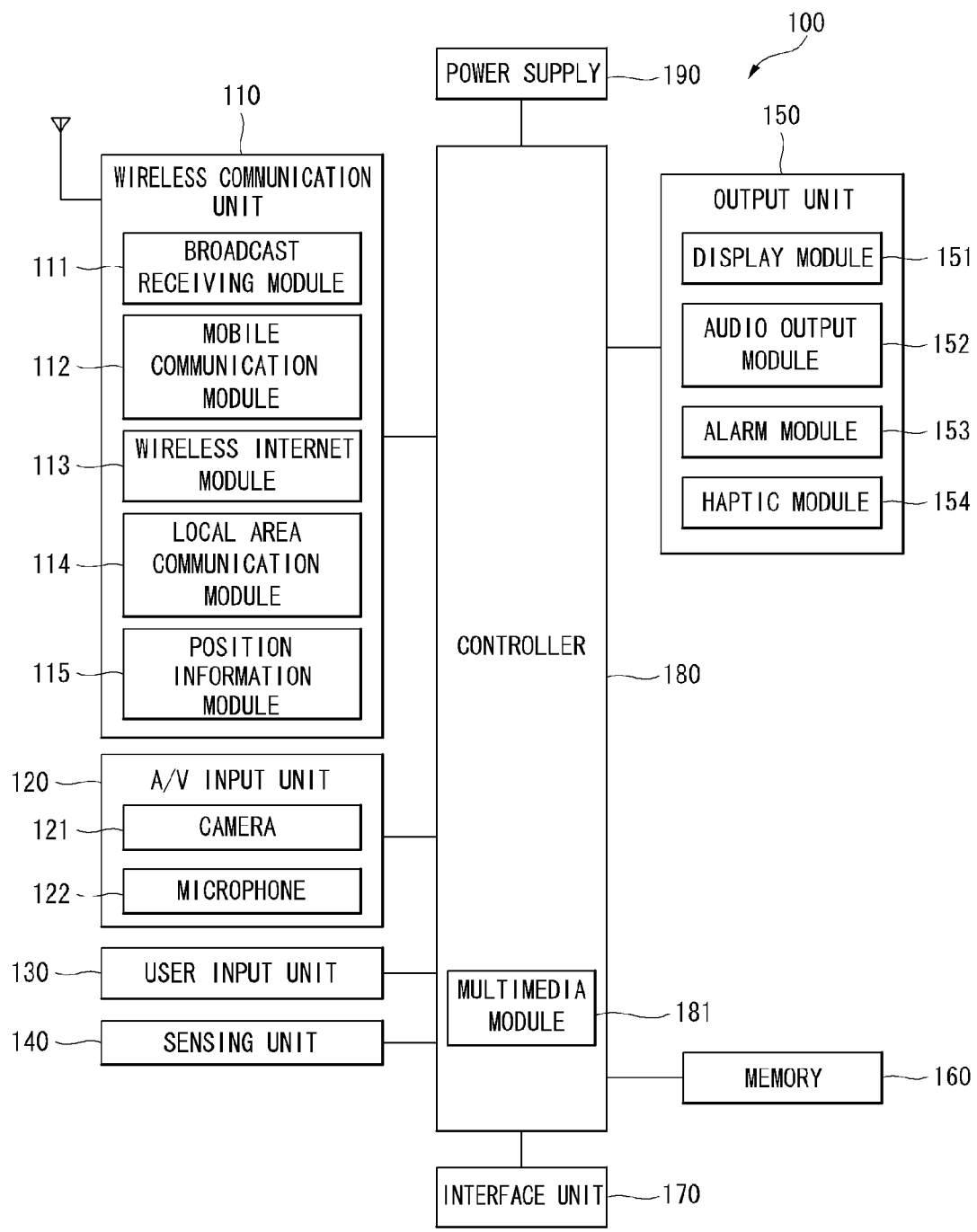
FIG. 1 is a block diagram illustrating a mobile terminal according to an embodiment of the present invention.

FIG. 1 is a block diagram of an implementation of a mobile terminal 100. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. Further, the local area communication module 114 corresponds to a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151. The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on. In addition, the sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154. The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display. Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides. When the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch. When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

A proximity sensor can also be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. A capacitive touch screen is constructed such that proximity of a pointer is detected through a variation in an electric field according to the proximity of the pointer. In this instance, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

In the foregoing description, a configuration of a mobile terminal 100 according to an embodiment of the present invention has been described with reference to FIG. 1. The mobile terminal 100 according to an embodiment of the present invention can also be embodied based on a multi-OS and a multi-display.

First, technical characteristics of the mobile terminal 100 according to an embodiment of the present invention that can be embodied based on a multi-OS and a multi-display are briefly described as follows.

(1) When an event related to a specific OS occurs, the mobile terminal 100 according to an embodiment of the present invention can allocate at least a portion of a display allocated to another OS to an output of an execution result of operation related to the occurred event.

(2) When an event related to a specific OS occurs, the mobile terminal 100 according to an embodiment of the present invention can output an execution result of operation in which another OS is executing through an external device.

(3) When an event related to a specific OS occurs, the mobile terminal 100 according to an embodiment of the present invention can allocate at least a portion of a display allocated to the specific OS to an output of an execution result of operation in which another OS is executing.

(4) When an event related to a specific OS occurs, the mobile terminal 100 according to an embodiment of the present invention can output an execution result of operation in which a specific OS is executing through an external device Hereinafter, embodiments of the present invention will be described in detail with reference to FIGS. 2 to 23. For reference, in FIGS. 2 to 23, it is assumed that two OSs are loaded and two displays are included in the mobile terminal 100. However, the present invention is not limited thereto. For example, at least three OSs may be loaded and at least three displays may be included in the mobile terminal 100.

Figure 2:
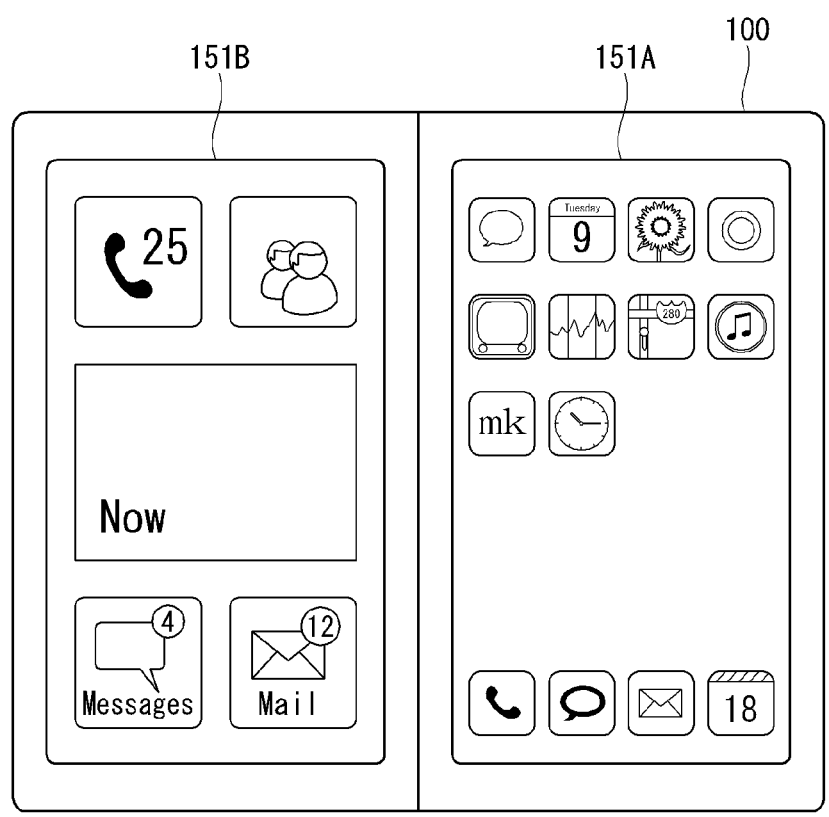
FIG. 2 illustrates an example of a screen of a mobile terminal according to an embodiment of the present invention.

FIG. 2 illustrates an example of a screen of the mobile terminal 100 according to an embodiment of the present invention. For reference, it is assumed that the OS loaded in the mobile terminal 100 is iOS and Windows phone 7. Referring to FIG. 2, the mobile terminal 100 includes a first display 151A allocated to an iOS (a first OS) and a second display 151B allocated to Windows phone 7 (a second OS). As shown in FIG. 2, icons for the first OS (iOS) are displayed in the first display 151A, and icons for the second OS (Windows phone 7) are displayed in the second display 151B.

When the first OS (iOS) related operation is performed, the controller 180 controls the first display 151A to display a result thereof, and when the second OS (Windows phone 7) related operation is performed, the controller 180 controls the second display 151B to output an operation result. According to an embodiment of the present invention, the controller 180 may be embodied as a separated chipset for a first OS (iOS) controller and a second OS (Windows phone 7) controller or may be embodied as one chipset.

FIG. 3 illustrates that only one display 151A or 151B is activated when the mobile terminal 100 is folded. For reference, FIG. 3(a) illustrates that the mobile terminal 100 is folded to display the second display 151B to the user, FIG. 3(b) illustrates that the mobile terminal 100 is folded to display the first display 151A to the user, and FIG. 3(c) illustrates an example in which the mobile terminal 100 is folded and unfolded.

In this instance, the controller 180 activates only a display viewed to the user and deactivates a display that is not viewed to the user. However, according to an embodiment of the present invention, the controller 180 may activate all of two displays. Further, in FIG. 3, as the mobile terminal 100 is folded or unfolded, a display state provided to the user can be varied, but a change of a display state like a method shown in FIG. 3 can be similarly applied to a slide type terminal of a form of additionally exposing one of the first display and the second display to the user. This can be similarly applied to embodiments to be described later.

Figure 4:
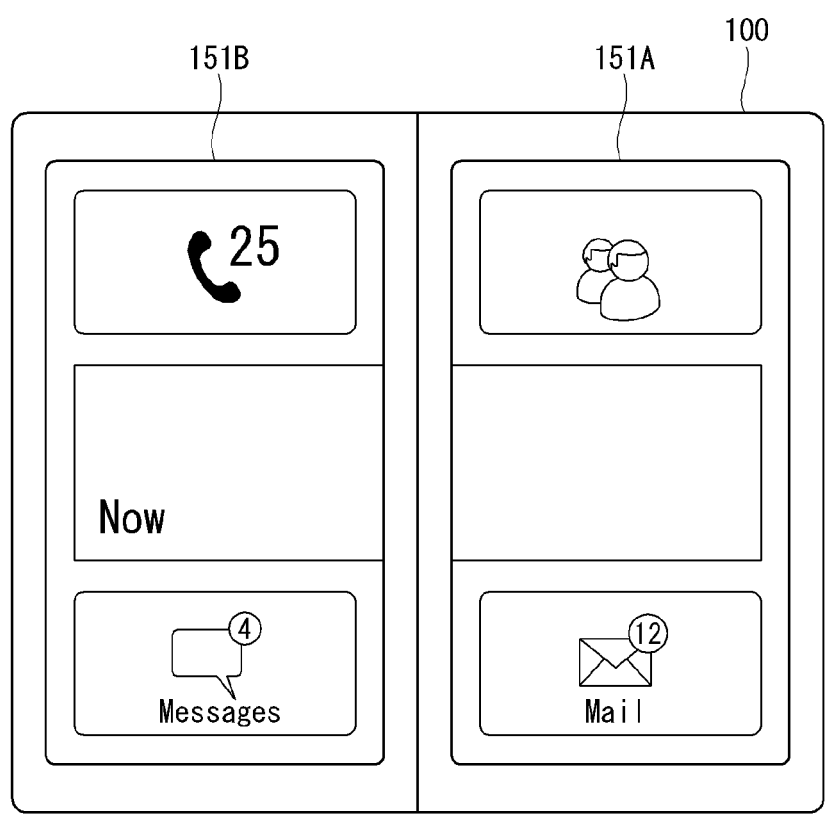
FIGS. 4 and 5 illustrate two activated displays when a mobile terminal according to an embodiment of the present invention is unfolded.
Figure 5:
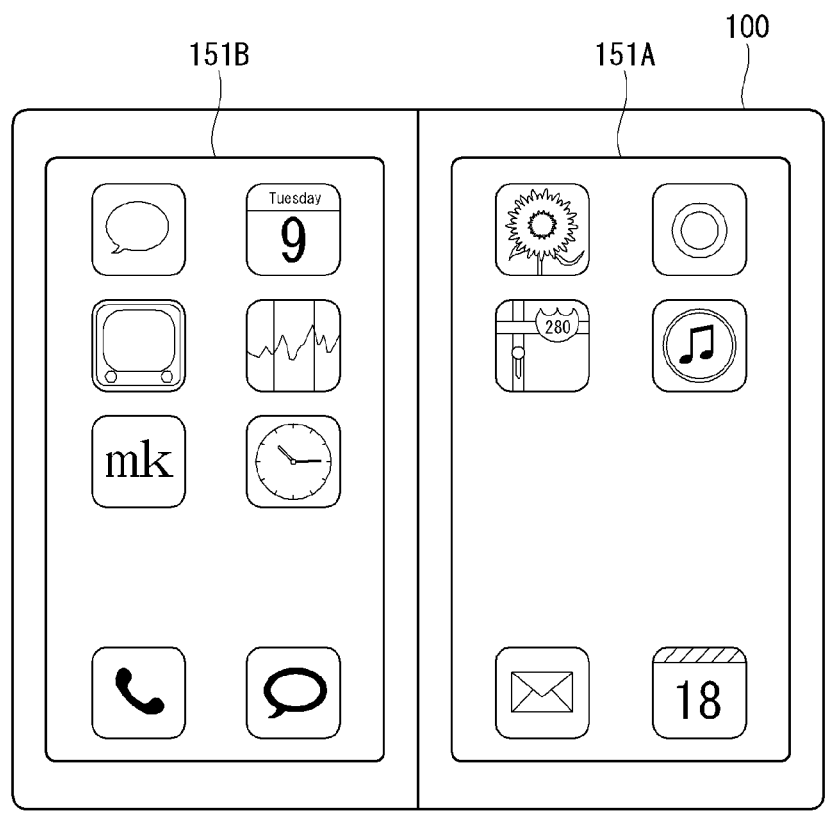

Next, FIGS. 4 and 5 illustrate that two displays 151A and 151B are activated when the mobile terminal 100 according to an embodiment of the present invention is unfolded. Referring to FIG. 4, when the mobile terminal 100 is unfolded, the controller 180 can allocate the two displays 151A and 151B for the second OS (Windows phone 7). In this instance, when the mobile terminal 100 is in a folded state, only the second display 151B corresponding to the second OS (Windows phone 7) may be in an activated state.

Referring to FIG. 5, when the mobile terminal 100 is an unfolded state, the controller 180 can allocate the two displays 151A and 151B for the first OS (iOS). In this instance, when the mobile terminal 100 is a folded state, only the first display 151A corresponding to the first OS (iOS) may be in an activated state.

Figure 6:
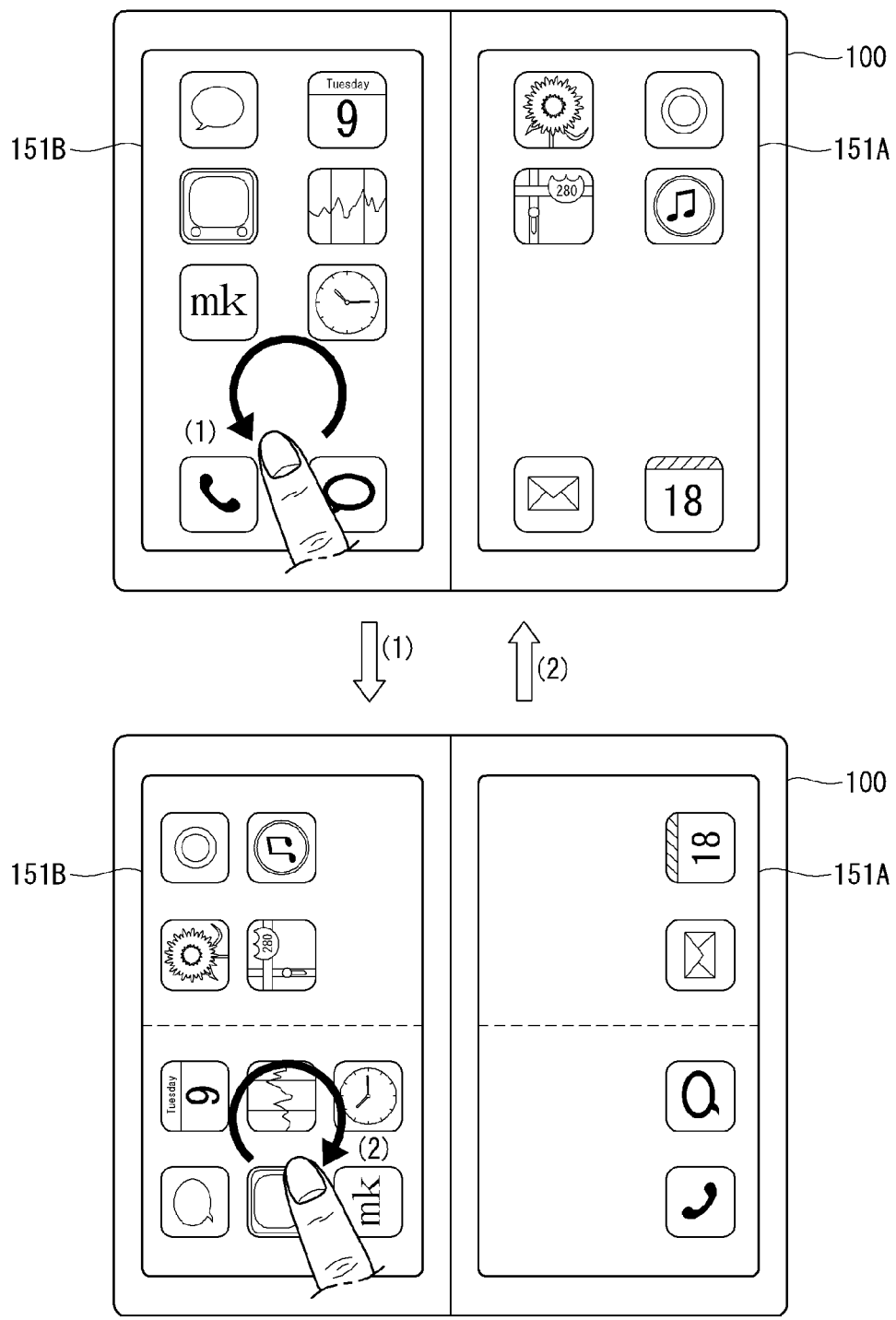
FIG. 6 illustrates a rotation of a screen displayed in a mobile terminal according to an embodiment of the present invention by a user's touch.

Next, FIG. 6 illustrates a rotation of a screen displayed in the mobile terminal 100 according to an embodiment of the present invention by a user's touch. Referring to FIG. 6, when a touch for rotating in a specific direction is received through the second display 151B, the controller 180 can rotate a screen of the first and second displays 151A and 151B in the specific direction.

In particular, FIG. 6 illustrates an example in which a screen of the two displays 151A and 151B rotates by responding to a touch received through the display 151B. However, according to another embodiment of the present invention, the controller 180 may rotate only a screen of a display in which a touch is received. Further, a form of a touch of rotating a screen in the mobile terminal 100 is not limited to a touch form shown in FIG. 6.

FIG. 7 illustrates a display state change according to whether the mobile terminal 100 is folded and includes a transparent dual-display. Referring to FIG. 7, when the mobile terminal is unfolded, an image is displayed in the first display 151A the second display 151B. When the mobile terminal 100 is folded, the image is displayed only on the first display 151. Because the first display 151A and the second display 151B are a transparent display, a person positioned at the rear side of the mobile terminal 100 can see an image in which a left image and a right image are inverted.

Figure 8:
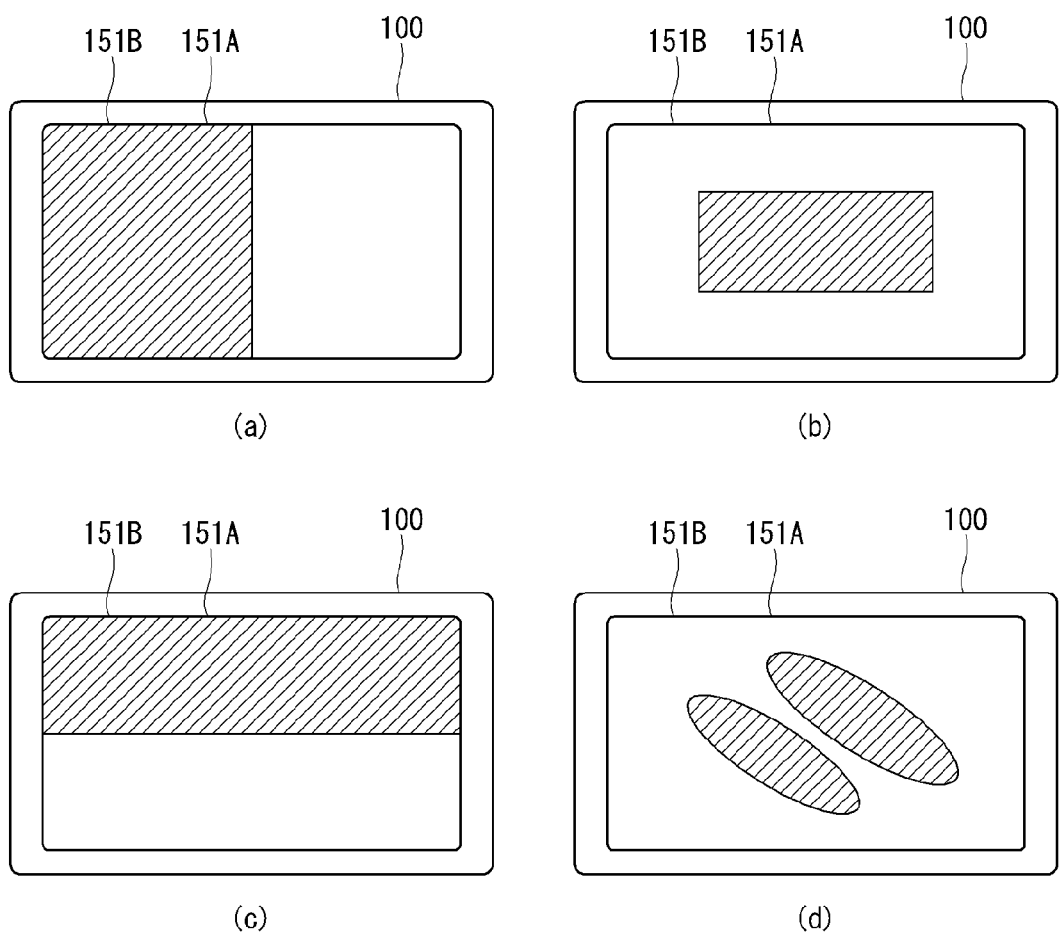
FIG. 8 illustrates examples in which an image is not displayed in a portion of a rear display when a mobile terminal according to an embodiment of the present invention including a transparent dual-display is folded.

Next, FIG. 8 illustrates an example in which an image is not displayed in a portion of a rear display when the mobile terminal 100 including a transparent dual-display is folded. Referring to FIG. 8, when the mobile terminal 100 is folded, a portion of the rear display is displayed in black, for example, and thus a person positioned at the rear side of the mobile terminal 100 cannot see a portion of the image. In this instance, it is preferable that some or all of the front display corresponding to a portion of the rear display is changed from a transparent display to an opaque display. Before and after the mobile terminal 100 is folded, some of the rear display may be set based on an area touched by the user or may be preset and information thereof be stored in the memory 160.

Figure 9:
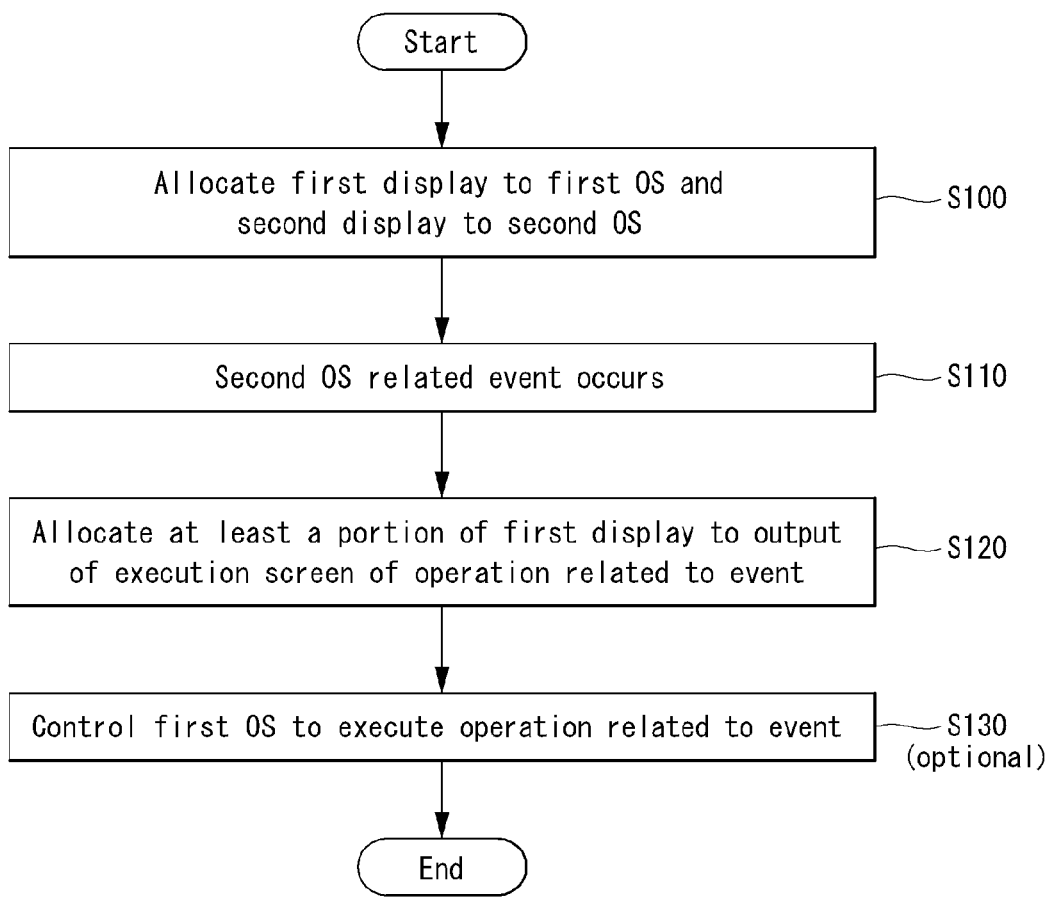
FIG. 9 is a flowchart illustrating a user interfacing method of a mobile terminal according to an embodiment of the present invention.

Next, FIG. 9 is a flowchart illustrating a user interfacing method of the mobile terminal 100 according to an embodiment of the present invention. In FIG. 9, it is assumed that the first OS (iOS) and the second OS (Windows phone 7) are loaded in the memory 160 of the mobile terminal 100. This is similar to other embodiments to be described later.

As shown in FIG. 9, the controller 180 allocates the first display 151A to the first OS (iOS) and the second display 151B to the second OS (Windows phone 7) (S100). In one embodiment of the present invention, allocation of a specific display to a specific OS means that a screen of a standby state of the specific OS and an execution result of operation related to the specific OS are displayed in the specific display.

Thereafter, an event related to the second OS (Windows phone 7) occurs (S110). Here, the second OS (Windows phone 7) related event may include call reception, short message service (SMS) message reception, multimedia message service (MMS) message reception, e-mail reception, and real time chat request reception of a social network service (SNS) corresponding to the second OS (Windows phone 7), and touch reception through the second display 151B corresponding to the second OS (Windows phone 7), but the present invention is not limited thereto.

When the event occurs, in consideration of a type of at least one of a first operation in which the first OS (iOS) is executing and a second operation related to the event, the controller 180 allocates at least a portion of the first display 151A to an output of an execution screen of the second operation (S120). Thereafter, the controller 180 controls the first OS to execute the second operation (S130).

That is, the second operation is originally set to be executed by the second OS (Windows phone 7), but in the mobile terminal 100 according to an embodiment of the present invention, when an execution screen of the second operation is displayed in the first display 151A, the first OS (iOS) may execute the second operation. Accordingly, the second OS (Windows phone 7) may be used for executing other operations other than the second operation.

As shown in FIG. 9, in a user interfacing method of the mobile terminal 100, execution of the second operation by the first OS (iOS) may be a selective step. When execution of the second operation is complete, the controller 180 reallocates at least a portion of the first display 151A to the first OS (iOS). However, according to an embodiment of the present invention, the controller 180 may use the first display 151A for the second OS (Windows phone 7) until a predetermined condition is satisfied.

Referring again to step S120, the controller 180 outputs an execution screen of the second operation through a portion of the first display 151A. In one example, the controller allocates a portion of the first display 151A to an output of an execution result of the second operation only when the controller 180 determines that the importance of the first operation in which the first OS (iOS) is executing is low. For example, when the first OS (iOS) is in an idle state, the first operation having low importance may be a web surfing operation and an environment setting operation of the mobile terminal 100, but the present invention is not limited thereto. The first operation having low importance may be preset and stored in the memory 160.

Further, in another example, only when the controller 180 determines that the second operation has a high importance, the controller 180 allocates a portion of the first display 151A to an output of an execution result of the second operation. For example, the second operation having high importance may be the call reception, SMS message reception, MMS message reception, and real time chat request reception of an SNS, but the present invention is not limited thereto. The second operation having high importance may be preset and stored in the memory 160.

Further, in consideration of both the importance of the first and second operations, the controller 180 may determine to allocate a portion of the first display 151A to an output of an execution result of the second operation. For example, if the importance of the second operation is higher than an importance of the first operation, the controller 180 can allocate a portion of the first display 151A.

Hereinafter, a specific example in which an execution result of the second operation is output through the first display 151A will be described with reference to FIGS. 10 to 15. In particular, FIGS. 10 and 11 illustrate a state change of a display of a mobile terminal 100 according to an embodiment of the present invention when a call related event related to a second OS (Windows phone 7) occurs according to the user interfacing method shown in FIG. 9.

Referring to FIG. 10(a), when a call related to the second OS (Windows phone 7) is received in an idle state of the first OS (iOS), the controller 180 displays that a call is received in the second display 151B when a standby screen of the first OS (iOS) is displayed in the first display 151A. As described previously and as shown in FIG. 10(a), the mobile terminal 100 may include a user identification module, for example, a subscriber identity module (SIM) corresponding to each of the first OS (iOS) and the second OS (Windows phone 7). Accordingly, the mobile terminal 100 can control each user identification modules to perform a function such as call transmission and reception and message transmission and reception.

Figure 10:
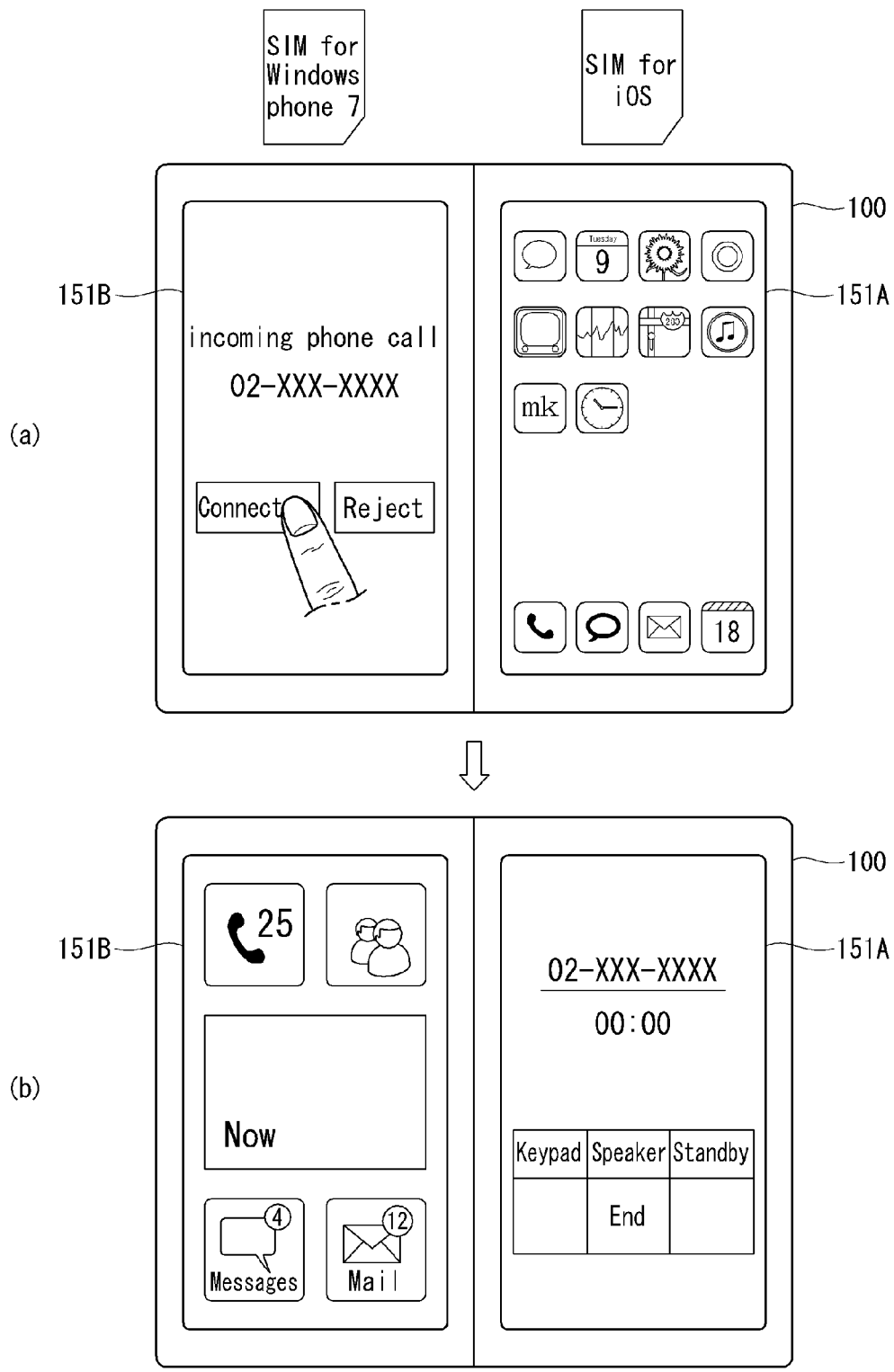

In a state of FIG. 10(a), when the user touches a connection button area displayed in the second display 151B, the controller 180 converts a screen of the second display 151B to a standby screen of the second OS (Windows phone 7) and controls the first display 151A to display a communication connection screen of a call as shown in FIG. 10(b). That is, in FIG. 10, the call reception and user's touch are an actual event related to the second OS (Windows phone 7).

Referring to FIG. 11(a), when a call related to the second OS (Windows phone 7) is received, the controller 180 controls the first display 151A to display that a call is received. That is, in FIG. 11(a), an event related to the second OS (Windows phone 7) is the call reception. Referring to FIG. 11(b), when the user touches an icon of a call transmitting application on a standby screen of the second OS (Windows phone 7), the controller 180 controls the first display 151A to display an execution screen of a call transmitting application for the second OS (Windows phone 7). That is, in FIG. 11(b), an event related to the second OS (Windows phone 7) is the touch reception through an icon of a call transmitting application.

Next, FIG. 12 illustrates a state change of a display of the mobile terminal 100 according to an embodiment of the present invention when a touch reception event related to the second OS (Windows phone 7) occurs according to the user interfacing method shown in FIG. 9. Referring to FIG. 12(a), in a state where a standby screen of the first OS (iOS)

is displayed in the first display 151A and a standby screen of the second OS (Windows phone 7) is displayed in the second display 151B, the user moves two touches in the second display 151B in a direction of the first display 151A. Accordingly, the controller 180 allocates the first display 151A to a standby screen output of the second OS (Windows phone 7).

Further, referring to FIG. 12(b), in a state where the standby screen of the second OS (Windows phone 7) is displayed in the first display 151A and the second display 151B, the user moves two touches in the first display 151A in a direction of the second display 151B. Accordingly, the controller 180 reallocates the first display 151B to the standby screen output of the first OS (iOS). FIG. 12(b) also illustrates just one example in which only a portion of the standby screen of the second OS is allocated to the first display 151A.

Figure 13:
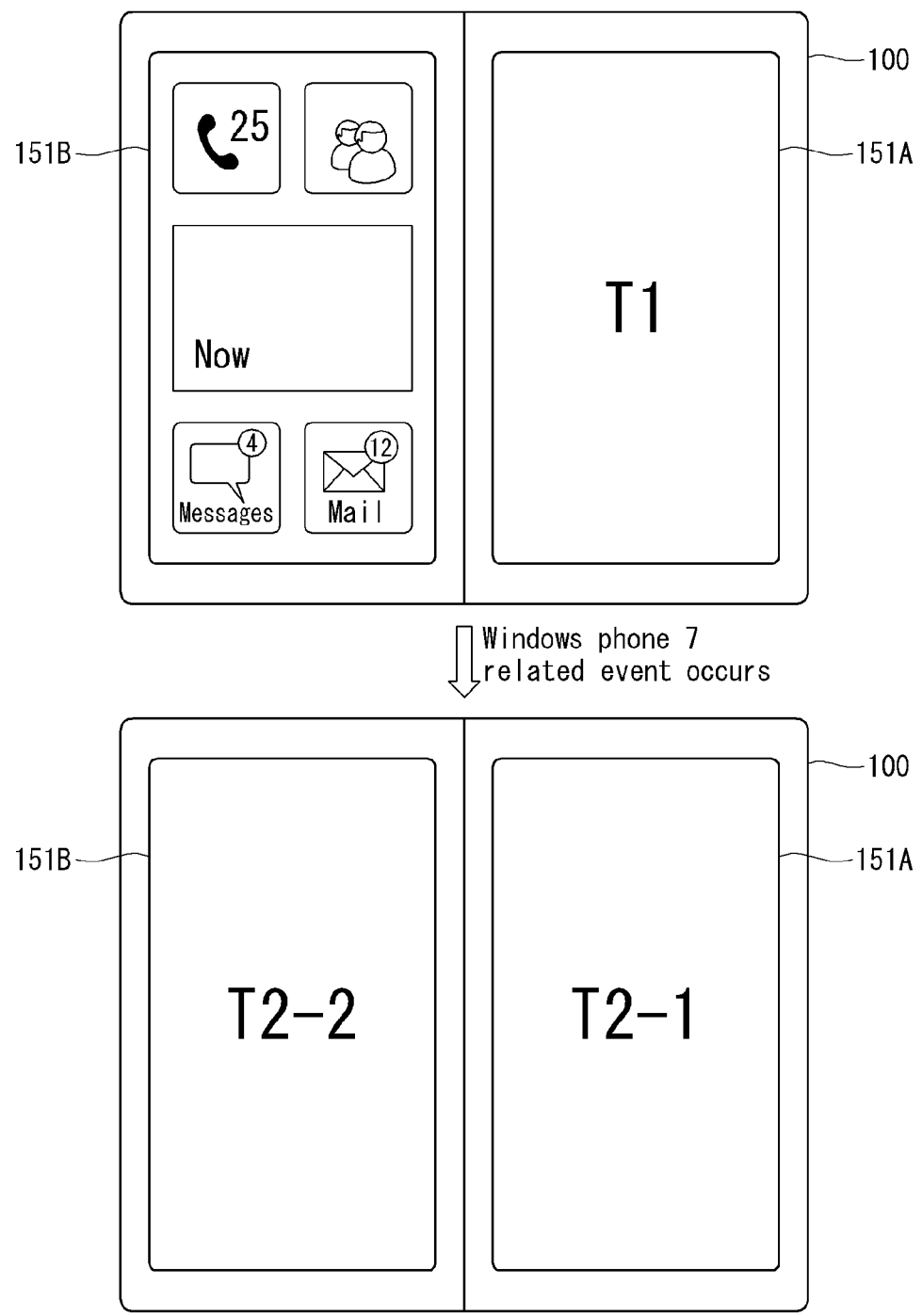
FIGS. 13 to 15 illustrate examples of a state change of a display of a mobile terminal according to an embodiment of the present invention when an event related to a second OS occurs according to the user interfacing method shown in FIG. 9.
Figure 14:
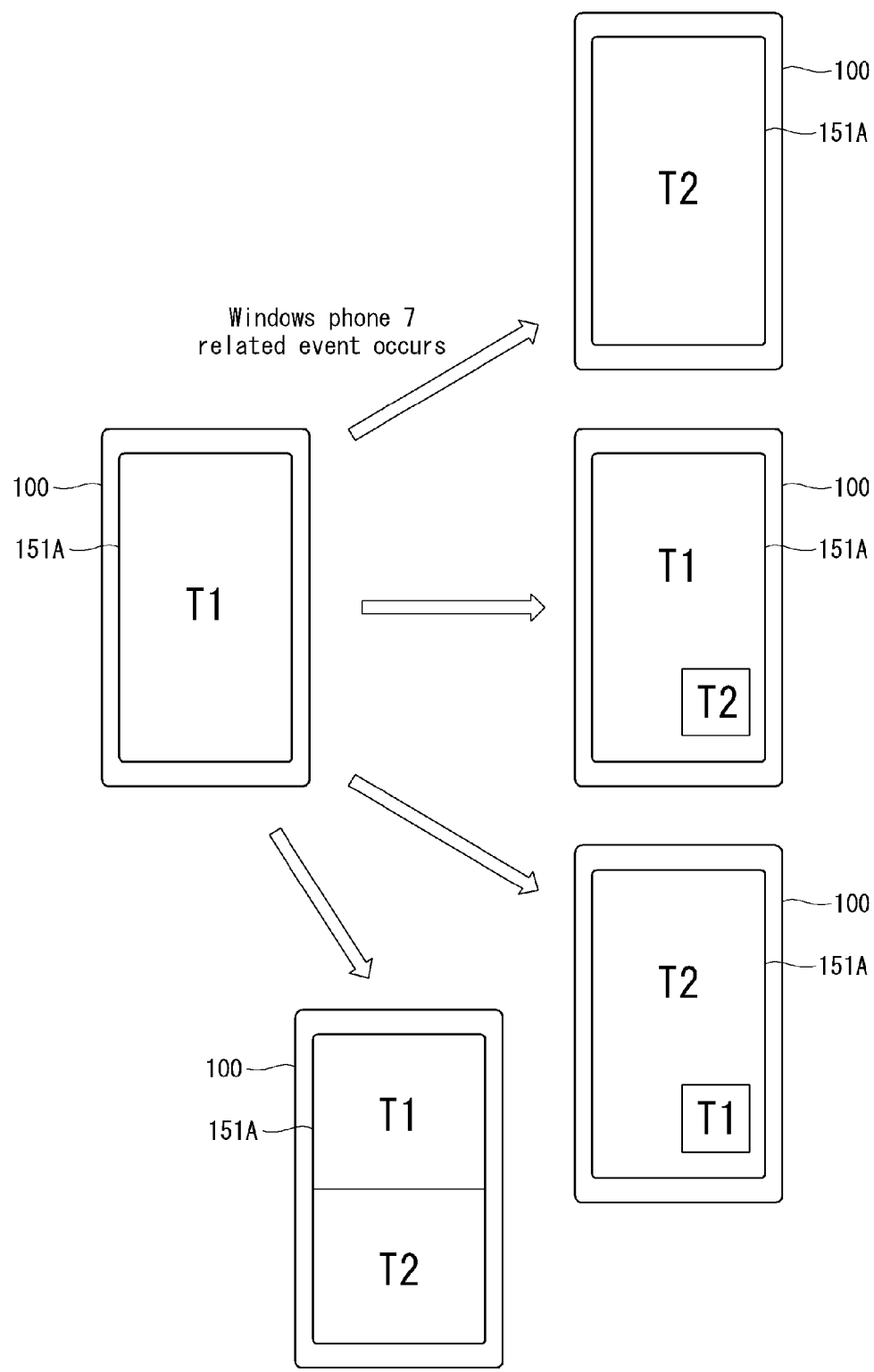
Figure 15:
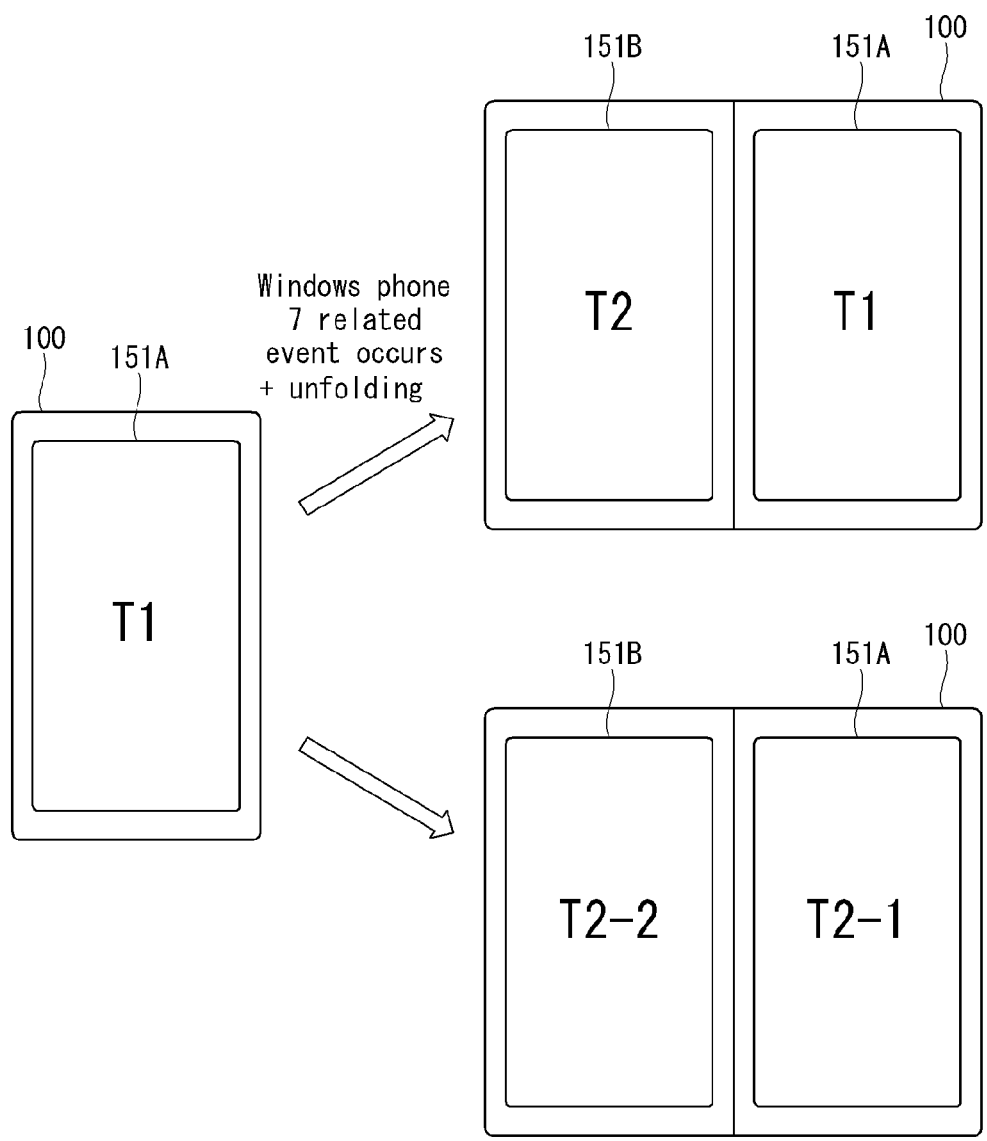

Next, FIGS. 13 to 15 illustrate examples of a state change of a display of the mobile terminal 100 according to an embodiment of the present invention when an event related to a second OS (Windows phone 7) occurs according to the user interfacing method shown in FIG. 9. Referring to FIG. 13, as the mobile terminal 100 is folded, when an execution screen T1 of the first operation is displayed in the first display 151A and a standby screen of the second OS (Windows phone 7) is displayed in the second display 151B, the second OS (Windows phone 7) related event occurs. Accordingly, the controller 180 displays screens T2-1 and T2-2 of the first operation related to the event in the first display 151A and the second display 151B, respectively.

Referring to FIG. 13, as the mobile terminal 100 is unfolded, and when an execution screen T1 of the first operation is displayed in the first display 151A and the standby screen of the second OS (Windows phone 7) is displayed in the second display 151B, the second OS (Windows phone 7) related event occurs. Accordingly, the controller 180 displays screens T2-1 and T2-2 of a second operation related to the event in the first display 151A and the second display 151B, respectively.

Referring to FIG. 14, as the mobile terminal 100 is folded, and when the execution screen T1 of the first operation is displayed in the first display 151A and the second display 151B is inactivated, the second OS (Windows phone 7) related event occurs. Accordingly, the controller 180 displays a screen T2 of a second operation related to the event in all or some of the first display 151A.

Referring to FIG. 15, as the mobile terminal 100 is folded, and when the execution screen T1 of the first operation is displayed in the first display 151A and the second display 151B is inactivated, the second OS (Windows phone 7) related event occurs, and the user unfolds the mobile terminal 100. Accordingly, the controller 180 controls the first display 151A to display an execution screen of the first operation and the second display 151B to display an execution screen of the second operation. Further, the controller 180 displays screens T2-1 and T2-2 of the second operation related to the event in the first display 151A and the second display 151B, respectively.

Figure 16:
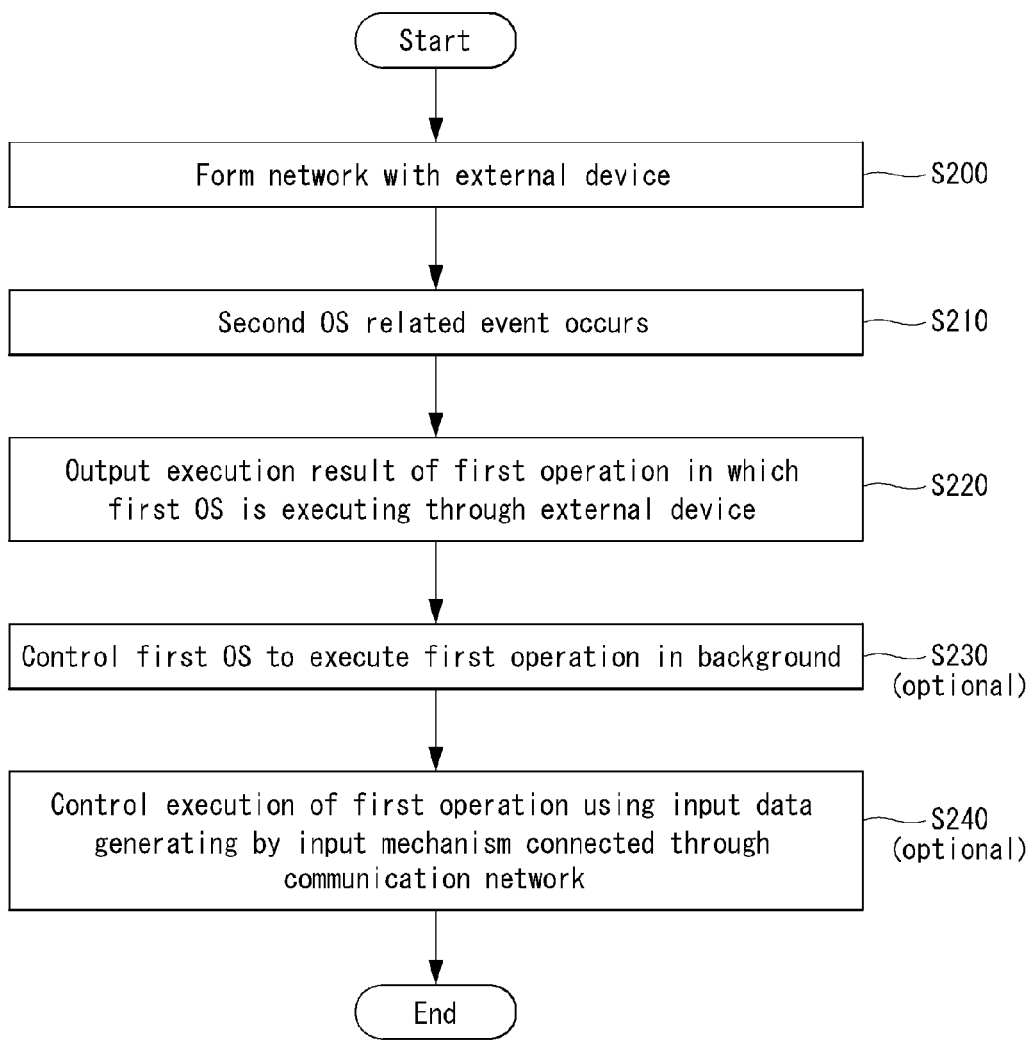
FIG. 16 is a flowchart illustrating a user interfacing method of a mobile terminal according to another embodiment of the present invention.

Next, FIG. 16 is a flowchart illustrating a user interfacing method of the mobile terminal 100 according to another embodiment of the present invention. As shown, the controller 180 forms a communication network with an external device using the wireless communication unit 110 (S200). The controller 180 may form a communication network with the external device through wired communication instead of wireless communication. In a state where a communication network with the external device is formed, a second OS (Windows phone 7) related event occurs (S210).

When the event occurs, the controller 180 outputs an execution result of a first operation in which the first OS is executing through the external device in consideration of a type or kind of at least one of the first operation in which the first OS (iOS) is executing and a second operation, which is an operation related to the event (S220). To determine whether to output an execution result of the first operation to the external device according to the importance of at least one of the first operation and the second operation is similar to a method of determining whether to output an execution result of the second operation to the first display 151A in consideration of the importance of the operations described with reference to FIG. 9 and therefore a detailed description thereof will be omitted.

Even if an execution result of the first operation is output through the external device, the controller 180 controls the first OS (iOS) to execute the first operation in a background (S230). Further, the controller 180 may control execution of the first operation using input data generating by an input mechanism connected to the communication network while controlling the first OS (iOS) to execute the first operation in a background (S240). As shown in FIG. 16, each of steps S230 and S240 may be an optional step.

Here, a control of execution of the first operation by the controller 180 using the input data may mean to control the first OS (iOS) to execute the first operation using the input data or to control the external device to execute the first operation using the input data. Further, an input mechanism connected to the communication network may be an input device of another electronic device connected to the communication network and may be a sharing input device for the mobile terminal 100 and the other electronic device.

FIGS. 17 to 19 illustrate examples of outputting an execution result of operation in which the first OS (iOS) is executing through an external device when a call reception event related to the second OS (Windows phone 7) occurs according to the user interfacing method shown in FIG. 16. Referring to FIG. 17, when the second OS (Windows phone 7) related call reception events occurs, the controller 180 controls the first display 151A to display a communication connection screen of the call reception event and to output an execution result of a memo operation for the first OS (iOS) using a personal computer (PC) system 200 through a wireless network formed by the wireless communication unit 110.

In this instance, an execution result of a memo operation for the iOS is displayed in a display unit 220 of the PC system 200. Further, when data is input using a keyboard, which is an input mechanism of the PC system 200, a main body 210 of the PC system 200 controls execution of the memo operation using the input data. If the keyboard is a wireless keyboard that can be compatible with the mobile terminal 100, the controller 180 may control the first OS (iOS) to execute the memo operation using data received through the keyboard and to output only an execution result of the memo operation to the PC system 200.

Referring to FIG. 18, when the second OS (Windows phone 7) related call reception events occurs, the controller 180 controls the first display 151A to display a communication connection screen of the call reception event and to output an execution result of a memo operation for the first OS (iOS) using a laptop computer 300 through a wireless network formed by the wireless communication unit 110. In this instance, an execution result of a memo operation for the iOS is displayed in the display unit 351 of the laptop computer 300. Further, when data is input through a keyboard, which is an input mechanism of the laptop computer 300, the laptop computer 300 controls execution of the memo operation using the input data.

Referring to FIG. 19, when the second OS (Windows phone 7) related call reception events occurs, the controller 180 controls the first display 151A to display a communication connection screen of the call reception event and to output an execution result of a memo operation for the first OS (iOS) through a smart pad 400 through a wireless network formed by the wireless communication unit 110. In this instance, an execution result of a memo operation for the iOS is displayed in a display unit 351 of the smart pad 400. Further, when data is input through a virtual keyboard, which is an input mechanism of the smart pad 400, the smart pad 400 controls execution of the memo operation using the input data.

In addition, the mobile terminal 100 according to an embodiment of the present invention may perform a user interfacing method according to a combination of a user interfacing method shown in FIGS. 9 and 16. That is, when the second OS (Windows phone 7) related event occurs, the mobile terminal 100 may output an execution result of the first operation through the external device while outputting an execution result of the second operation related to the event to at least a portion of the first display 151A.

Figure 20:
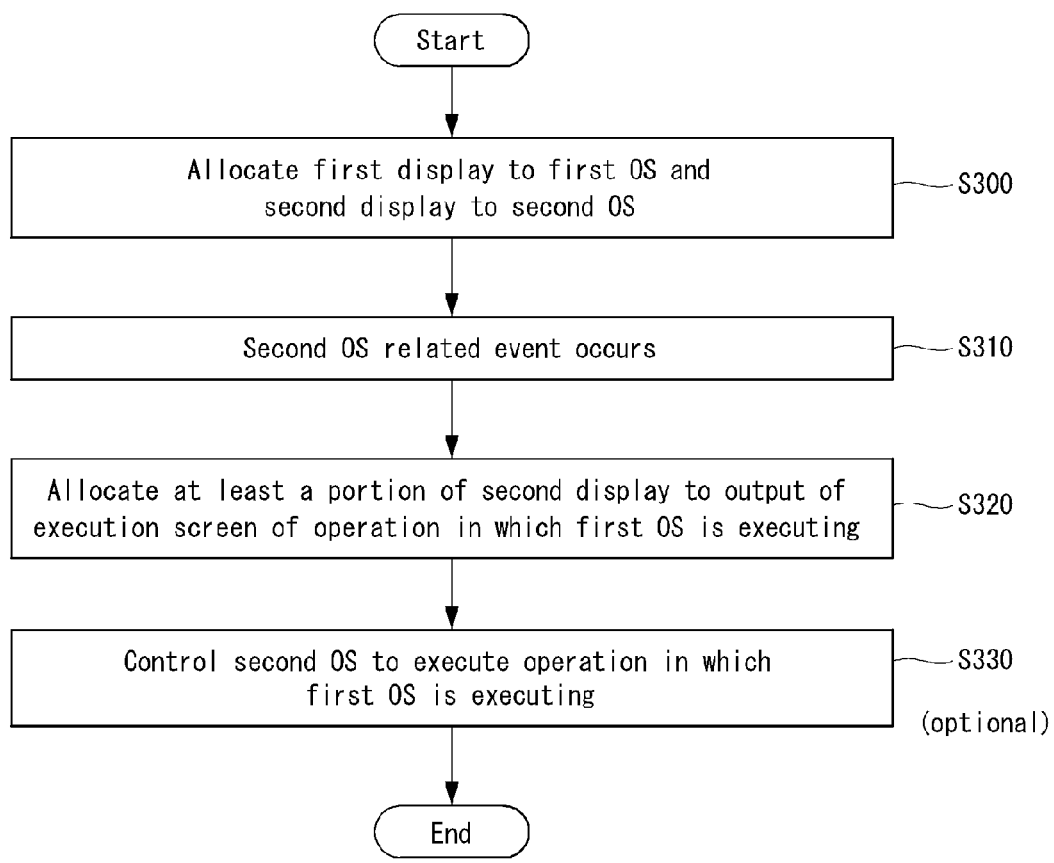
FIG. 20 is a flowchart illustrating a user interfacing method of a mobile terminal according to another embodiment of the present invention.

Next, FIG. 20 is a flowchart illustrating a user interfacing method of the mobile terminal 100 according to another embodiment of the present invention. As shown, the controller 180 allocates the first display 151A to the first OS (iOS) and the second display 151B to the second OS (Windows phone 7) (S300). Thereafter, the second OS (Windows phone 7) related event occurs (S310).

When the event occurs, the controller 180 allocates a portion of the second display 151B to an output of an execution screen of a first operation corresponding to the executing first OS. The allocation can be made based on a type of one of the first operation and a second operation related to the event (S320). To determine whether to output an execution result of the first operation through the second display 151B according to the importance of at least one of the first and second operations is similar to the method described in FIG. 9 and therefore a detailed description thereof will be omitted.

Thereafter, the controller 180 may control the second OS to execute the first operation (S330). That is, the first operation is originally set to be executed by the first OS (iOS), but in the mobile terminal 100 according to an embodiment of the present invention, when an execution screen of the first operation is displayed in the second display 151B, the second OS (Windows phone 7) may execute the first operation. Accordingly, the first OS (iOS) may be used for executing other operations other than the first operation.

As shown in FIG. 20, execution of the first operation by the second OS (Windows phone 7) may be an optional step. When execution of the first operation is complete, the controller 180 may reallocate at least a portion of the second display 151B to the second OS (Windows phone 7). However, according to an embodiment of the present invention, the controller 180 may use the second display 151B for the first OS (iOS) until a predetermined condition is satisfied.

Figure 21:
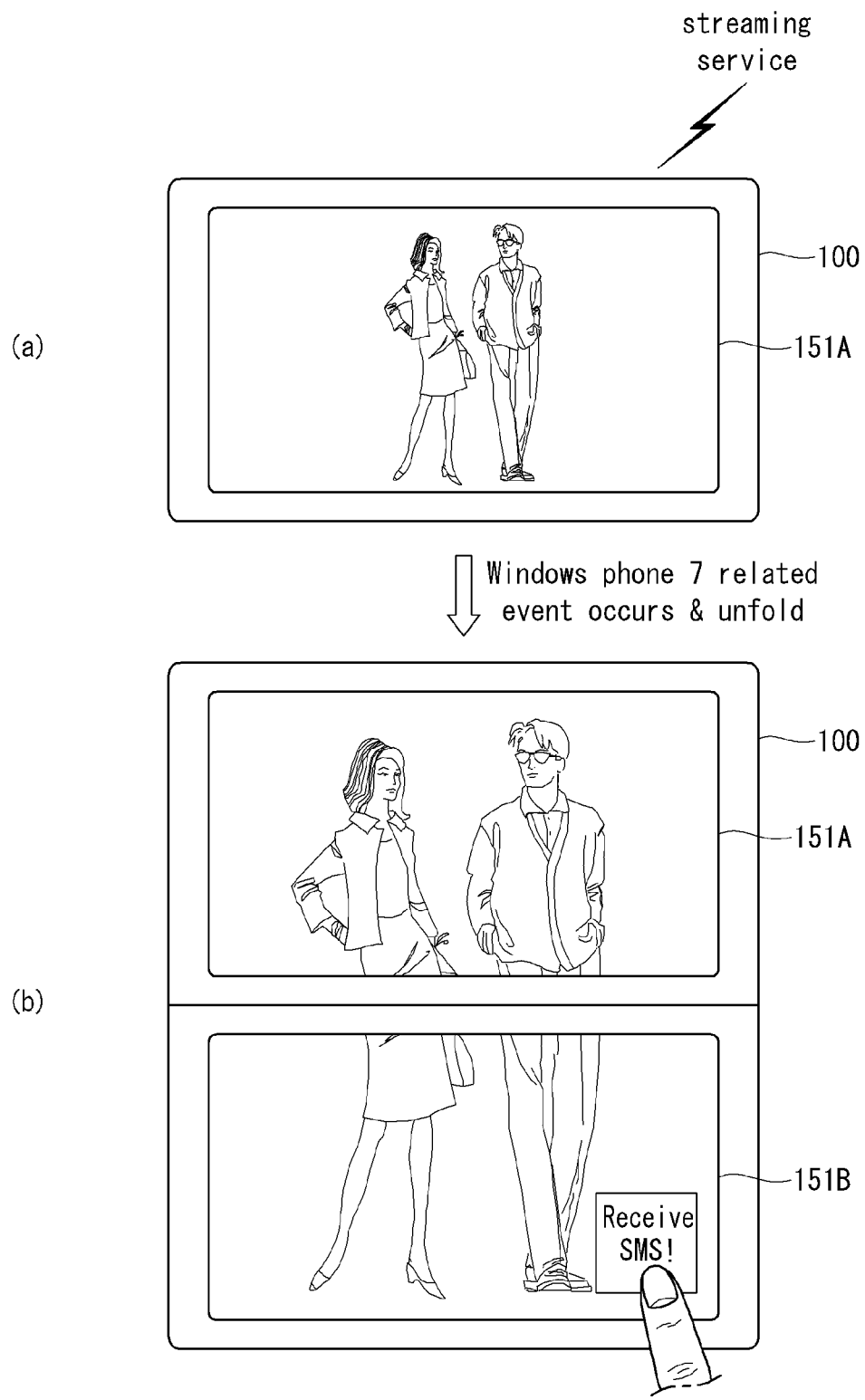

Next, FIGS. 21 and 22 illustrate a state change of a display of the mobile terminal 100 according to an embodiment of the present invention according to the user interfacing method shown in FIG. 20. In particular, FIG. 21(a) illustrates execution of a first operation in which the first OS receives an image using a streaming service through a wireless communication network and displays the image in the first display 151A in a state where the mobile terminal 100 is folded.

In the state of FIG. 21(a), when an SMS message reception event, which is the second OS (Windows phone 7) related event occurs and the user unfolds the mobile terminal 100, the controller 180 allocates a portion of the second display 151B to display an execution result of the first operation, as shown in FIG. 21(b). Accordingly, the user can simultaneously determine an execution result of the second operation related to an SMS message reception event and an execution result of the first operation, and can read an SMS message by touching a display area of the execution result of the second operation.

In addition, in FIG. 21(a), part of the streaming content is displayed in the first display 151A and the other part is displayed in the second display 151B. The controller 180 can control both the first OS and the second OS to execute and display the streaming service contents or allow the second OS to completely control both of the first and second displays 151A and 151B to output the streaming service.

FIG. 22(a) illustrates that the first OS (iOS) receives an image using a streaming service through a wireless communication network and executes the first operation of displaying the image in the first display 151A and displays a standby screen of the second OS (Windows phone 7) in the second display 151B in a state where the mobile terminal 100 is folded. In a state of FIG. 22(a), when an SMS message reception event, which is the second OS (Windows phone 7) related event occurs, the controller 180 allocates a portion of the first display 151A to display an execution result of the incoming message, as shown in FIG. 22(b).

Figure 23:
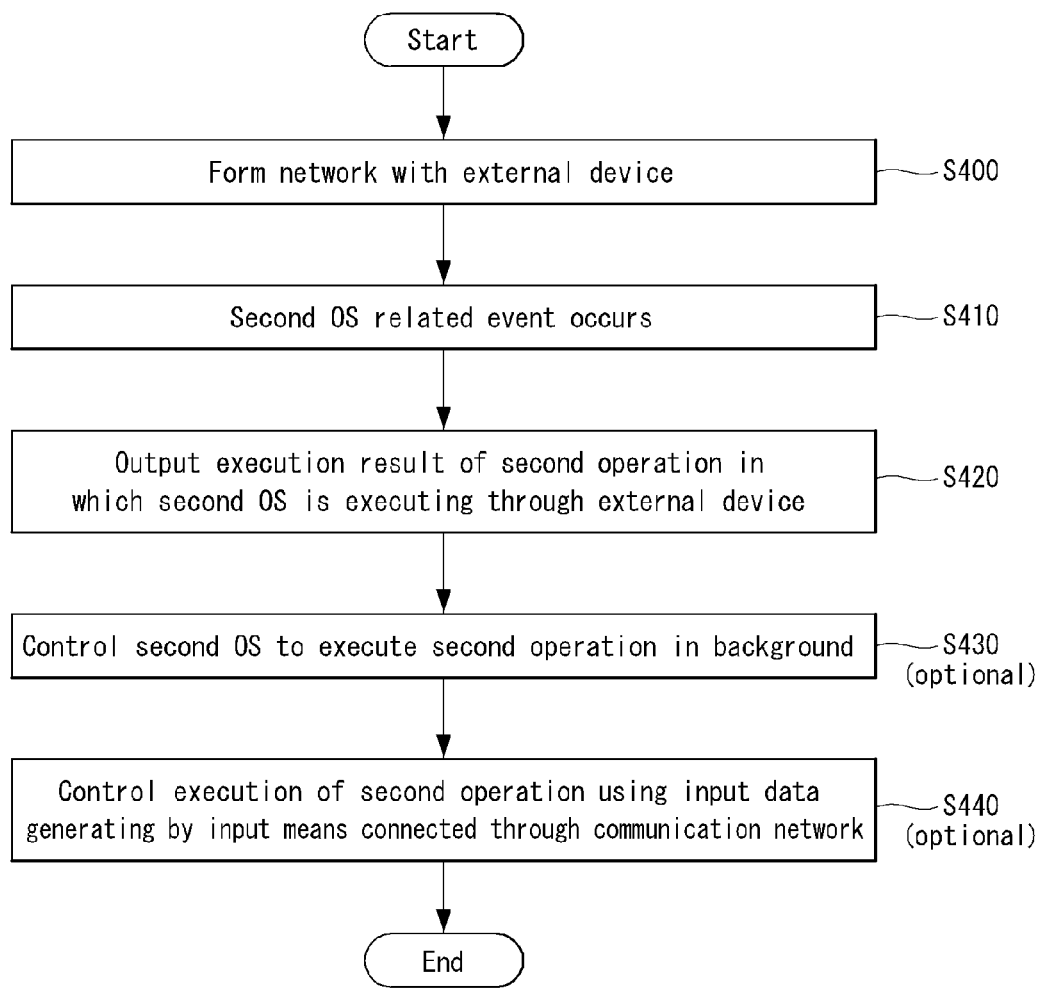
FIG. 23 is a flowchart illustrating a user interfacing method of a mobile terminal according to another embodiment of the present invention.

Next, FIG. 23 is a flowchart illustrating a user interfacing method of the mobile terminal 100 according to another embodiment of the present invention. As shown, the controller 180 forms a communication network with an external device using the wireless communication unit 110 (S400). The controller 180 may form a communication network with the external device through wired communication instead of wireless communication. In a state where a communication network with the external device is formed, the second OS (Windows phone 7) related event occurs (S410).

When the event occurs, the controller 180 outputs an execution result of a second operation in which the second OS (Windows phone 7) is executing through the external device in consideration of a type of at least one of the first operation in which the first OS (iOS) is executing and the second operation related to the event (S420). To determine whether to output an execution result of the first operation to an external device according to the importance of at least one of the first and second operations is similar to the description with reference to FIG. 9 and therefore a detailed description thereof will be omitted.

Even if the execution result of the second operation is output through the external device, the controller 180 controls the second OS (Windows phone 7) to execute the second operation in a background (S430). Further, the controller 180 may control execution of the second operation using input data generating by an input mechanism connected to the communication network while controlling the second OS (Windows phone 7) to execute the first operation in a background (S440). As shown in FIG. 23, each of steps S430 and S440 may be an optional step.

Here, controlling the execution of the second operation by the controller 180 using the input data may mean to control the second OS (Windows phone 7) to execute the second operation using the input data or to control the external device to execute the second operation using the input data. Further, an input mechanism connected to the communication network may be an input device of another electronic device connected to the communication network, or a sharing input device of all of the mobile terminal 100 and the another electronic device.

In addition, the mobile terminal 100 according to an embodiment of the present invention may perform a user interfacing method according to a combination of user interfacing methods shown in FIGS. 20 and 23. That is, when the second OS (Windows phone 7) related event occurs, the mobile terminal 100 may output an execution result of the second operation through the external device while outputting an execution result of the first operation related to the event to at least a portion of the second display 151B.

In the foregoing embodiment, a user interfacing method in the mobile terminal 100 including a plurality of OSs and a plurality of displays has been described with reference to FIGS. 2 to 23. Hereinafter, a user interfacing method in a mobile terminal 100 including a plurality of OSs and one display will be described.

Figure 24:
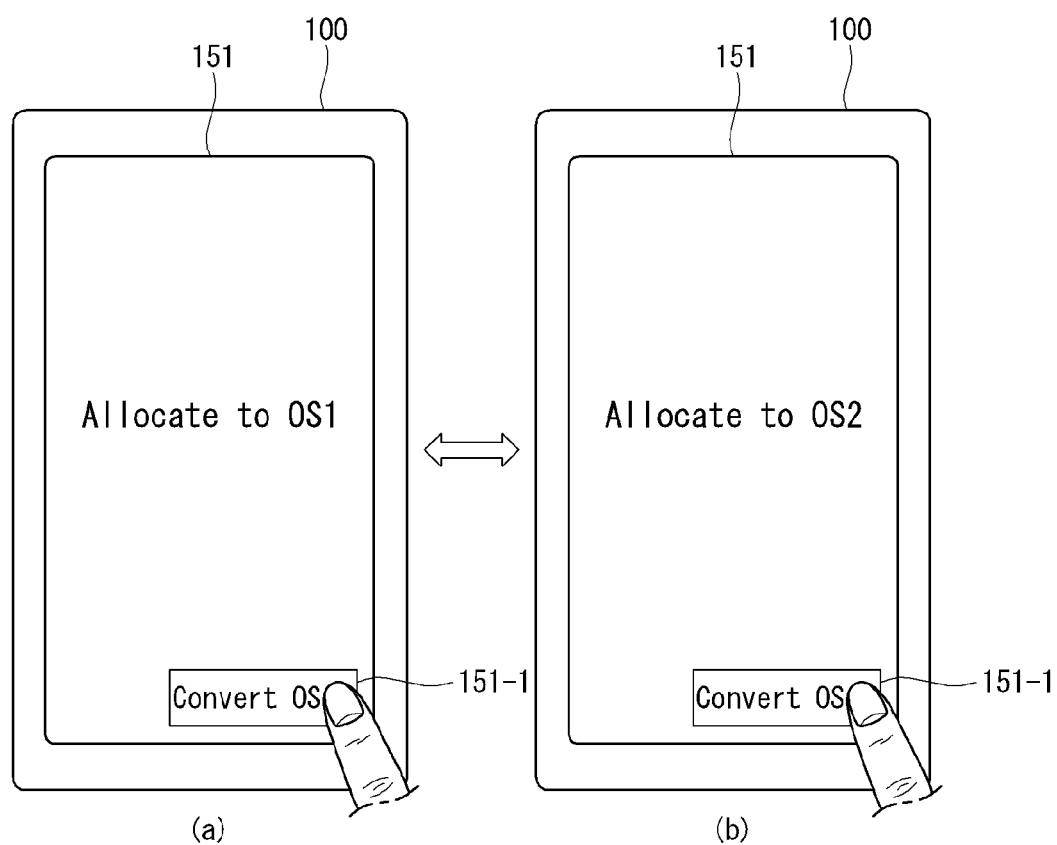
FIG. 24 illustrates an example of changing an OS allocated to one display in a mobile terminal according to an embodiment of the present invention including the one display.

FIG. 24 illustrates an example of changing an OS allocated to one display 151 in the mobile terminal 100 according to an embodiment of the present invention. In particular, FIG. 24(a) illustrates a state where the display 151 is allocated to the first OS. In the state of FIG. 24(a), the user touches a button 151-1 for converting an OS allocated to the display 151 from the first OS to the second OS. Accordingly, the controller 180 converts an OS allocated to the display 151 to the second OS, as shown in FIG. 24(b). Further, when the user touches the OS conversion button 151-1 in a state of FIG. 24(b), the controller 180 converts the second OS allocated to the display 151 to the first OS.

Figure 25:
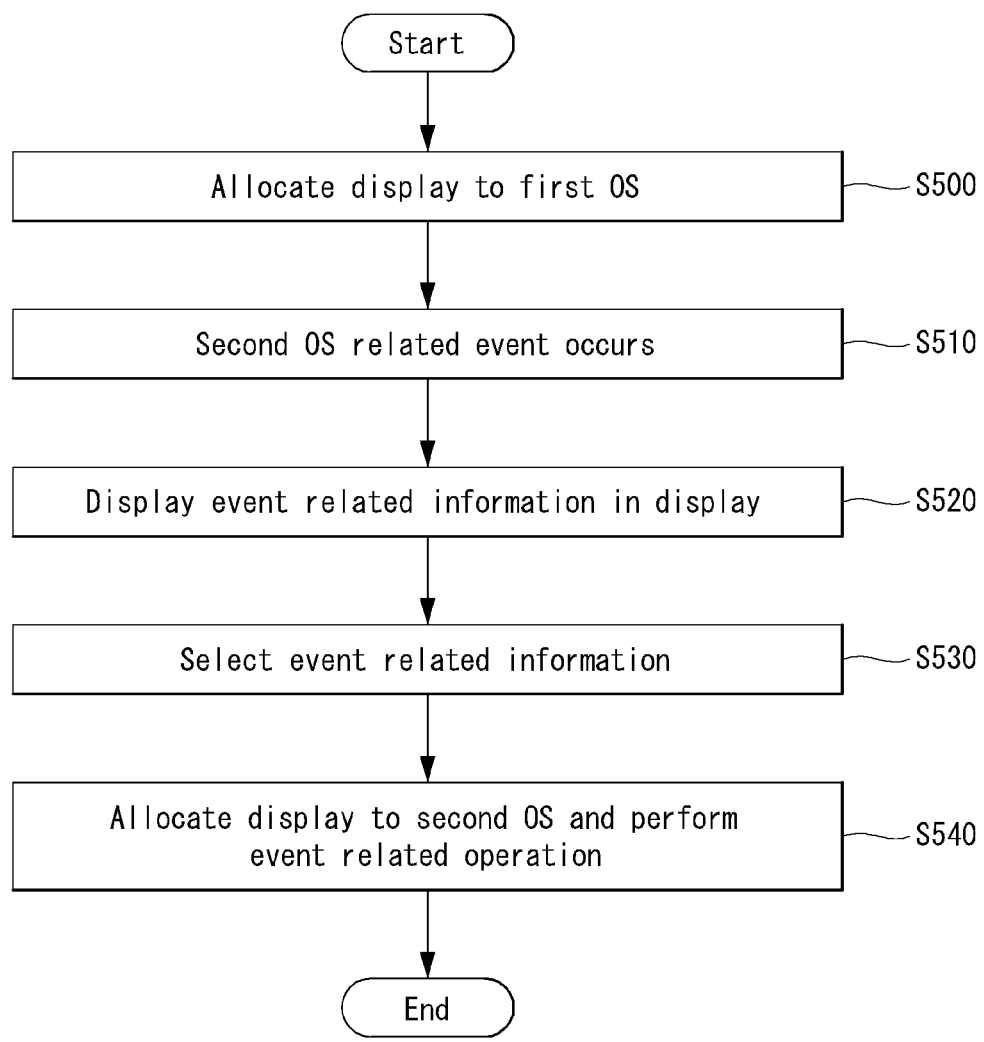
FIG. 25 is a flowchart illustrating a process of converting an OS allocated to a display to an OS corresponding to an occurred event in a mobile terminal according to an embodiment of the present invention.

Next, FIG. 25 is a flowchart illustrating a process of converting an OS allocated to the display 151 to an OS corresponding to an occurred event in the mobile terminal 100 according to an embodiment of the present invention. As shown, the display 151 is allocated to the first OS (S500). In a state where the display 151 is allocated to the first OS, the second OS related event occurs (S510). Accordingly, the controller 180 controls the display 151 to display the event related information (S520). The user selects the event related information displayed in the display 151 (S530). Thereafter, the controller 180 allocates the display 151 to the second OS and performs the event related operation (S540).

According to another embodiment of the present invention, in a state where the display 151 is allocated to the first OS, when the second OS related event occurs, the controller 180 may directly allocate the display 151 to the second OS and execute the event related operation or may display the event related information in the display 151, allocate the display 151 to the second OS, and then perform the event related operation without steps S520 to S530 of FIG. 25. Further, according to another embodiment of the present invention, the controller 180 may allocate an upper part of the display 151 to the first OS and a lower part of the display 151 to the second OS.

Figure 26:
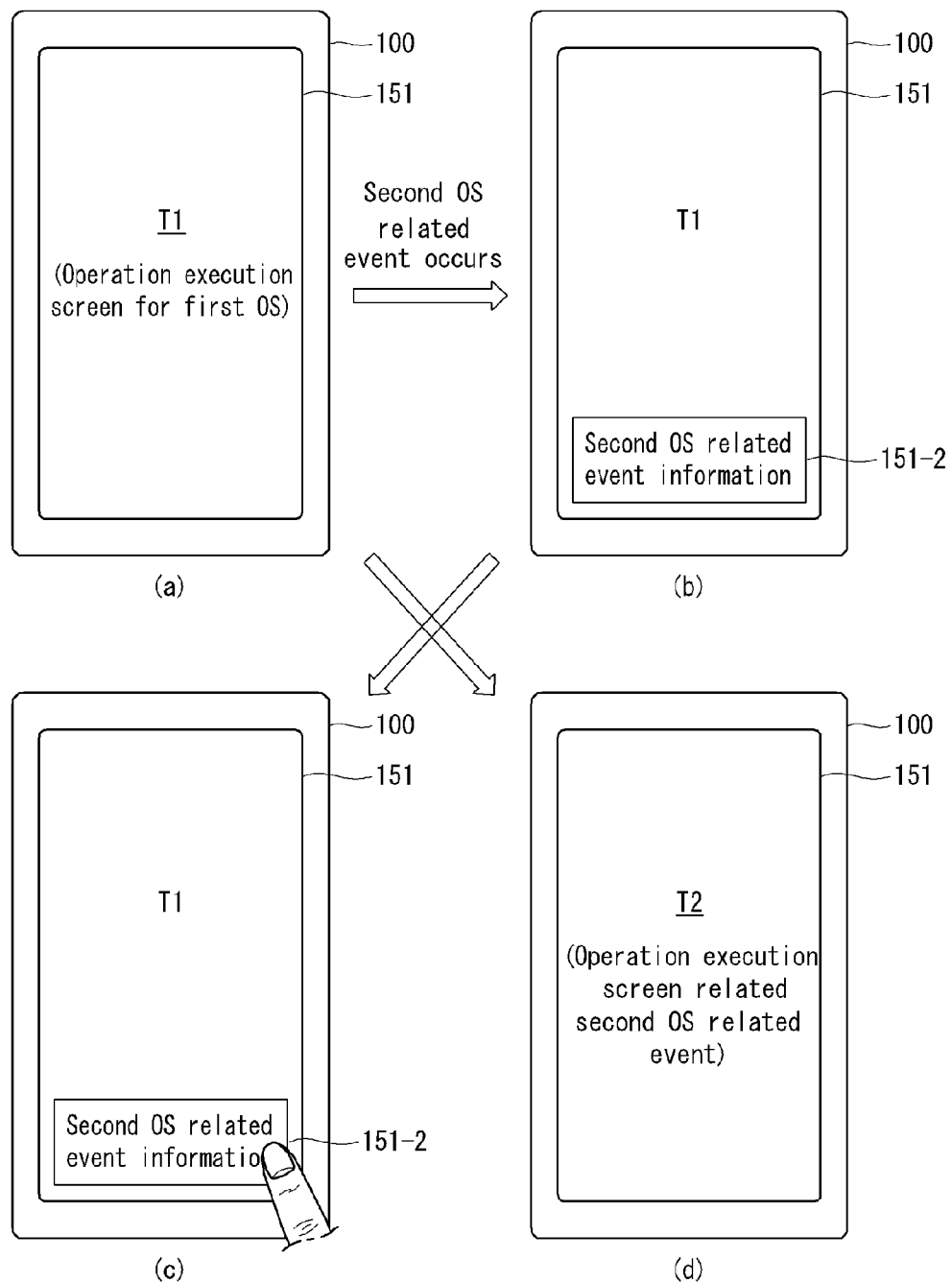
FIG. 26 illustrates examples of converting an OS allocated to a display according to an OS conversion process shown in FIG. 25.

FIG. 26 illustrates examples of converting an OS allocated to a display 151 according to an OS conversion process shown in FIG. 25. In FIG. 26(a), the display 151 is allocated to the first OS and an operation screen T1 for the first OS is displayed in the display 151. In a state of FIG. 26(a), the second OS related event occurs. Accordingly, the controller 180 may allocate the display 151 to the second OS and then allocate an execution screen T2 of the event related operation to the display 151, as in a state of FIG. 26(d).

Further, according to an order shown in FIG. 26, the controller 180 controls the display 151 to display event related information 151-2 (FIG. 26(b)) and when the user selects the event related information 151-2 (FIG. 26(c)), the controller 180 may allocate the display 151 to the second OS and control the display 151 to display the event related operation T2 (FIG. 26(d)).

A more detailed example will now be described when the mobile terminal 100 is allocated to the first OS, and the second OS related call is received. In this example, the controller 180 controls the display 151 to display information in which the second OS related call is received, and when the user touches the call receiving information, the controller 180 allocates the display 151 to the second OS and controls the display 151 to display a phone application execution screen for responding to call reception. Further, the controller 180 may control the display 151 to display event related information 151-2 (FIG. 26(c)), allocate the display 151 to the second OS regardless of a user's selection, and control the display 151 to display the event related operation T2 (FIG. 26(d)).

Figure 27:
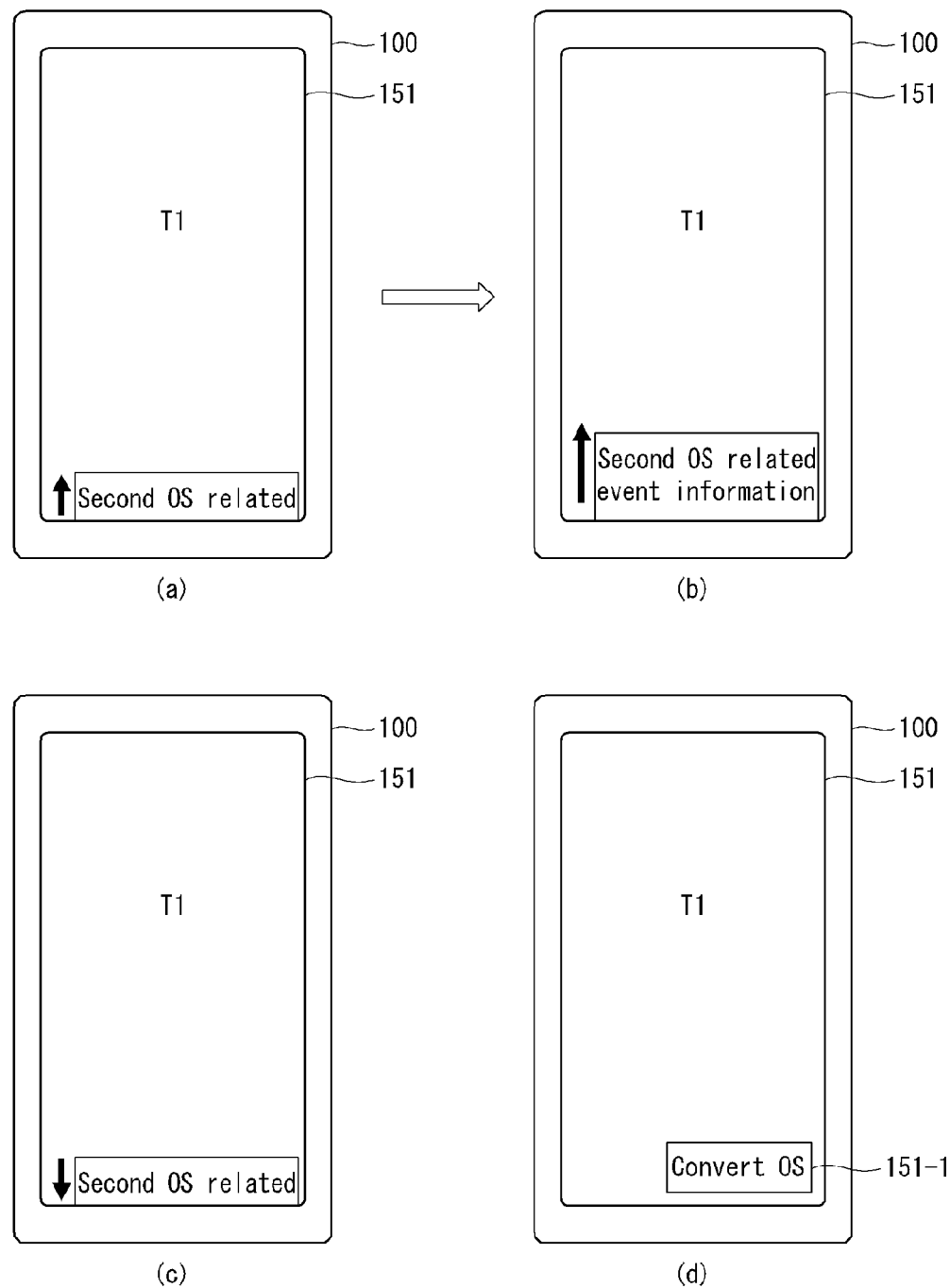
FIG. 27 illustrates an example of displaying an event related information in a display when a second OS related event occurs in a state where the display is allocated to a first OS in a mobile terminal according to an embodiment of the present invention.

Next, FIG. 27 illustrates an example in which event related information is displayed in the display 151 when a second OS related event occurs in a state where the display 151 is allocated to the first OS in the mobile terminal 100 according to an embodiment of the present invention. Referring to FIGS. 27(a) to 27(c), the display area 151-1 of the event related information slowly increases, and the entire event related information is displayed in the display 151 and then slowly decreases again and disappear. Unlike that shown in FIG. 27, a direction in which an event related information display area 151-1 is displayed and disappeared may be an upper part, a left side, and a right side of the display 151.

When the display area 151-1 of the event related information is displayed and disappeared in the display 151, the controller 180 controls the display 151 to display a button for converting an OS which the display 151 is allocated from a first OS to a second OS, as shown in FIG. 27(d). Further, according to another embodiment of the present invention, the controller 180 does not display the button in the display 151, and when a predetermined time has elapsed after the event related information display area disappears, the controller 180 may allocate the display 151 to the second OS.

Figure 28:
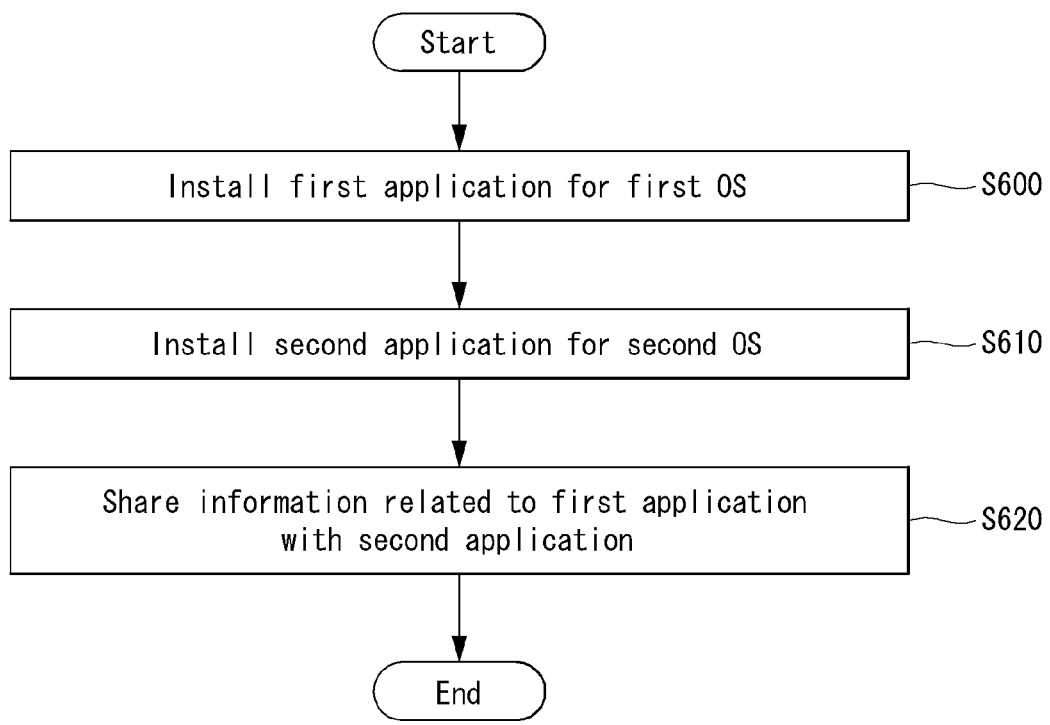
FIG. 28 is a flowchart illustrating a method in which applications for performing the same function in different OSs share information in a mobile terminal according to an embodiment of the present invention.

Next, FIG. 28 is a flowchart illustrating a method in which applications for performing the same function in different OSs share information in the mobile terminal 100 according to an embodiment of the present invention. As shown, the first application for the first OS is installed in the mobile terminal 100 (S600). Further, the second application for the second OS is installed for performing the same function as that of the first application (S610). The first and second applications may be installed when manufacturing the mobile terminal 100 or may be installed by a user after the mobile terminal 100 is manufactured.

Accordingly, the controller 180 shares information related to the first application with the second application (S620). For example, the controller 180 may control the first and second applications to share initial setting information when manufacturing the mobile terminal 100. Further, the controller 180 may share first application setting information changed by the user or share information generated as an execution result of the first application with the second application. Activation and inactivation of information sharing between predetermined applications may be controlled by the user.

In the mobile terminal 100 according to an embodiment of the present invention, an application on an OS basis that performs the same function of sharing information may be an application useful for a user when sharing information or having a low actual profit in distinguishing an OS, such as a phone application, a phonebook application, an alarm application, and a memo application. Further, an application on an OS basis to share information may be determined by the user.

Figure 29:
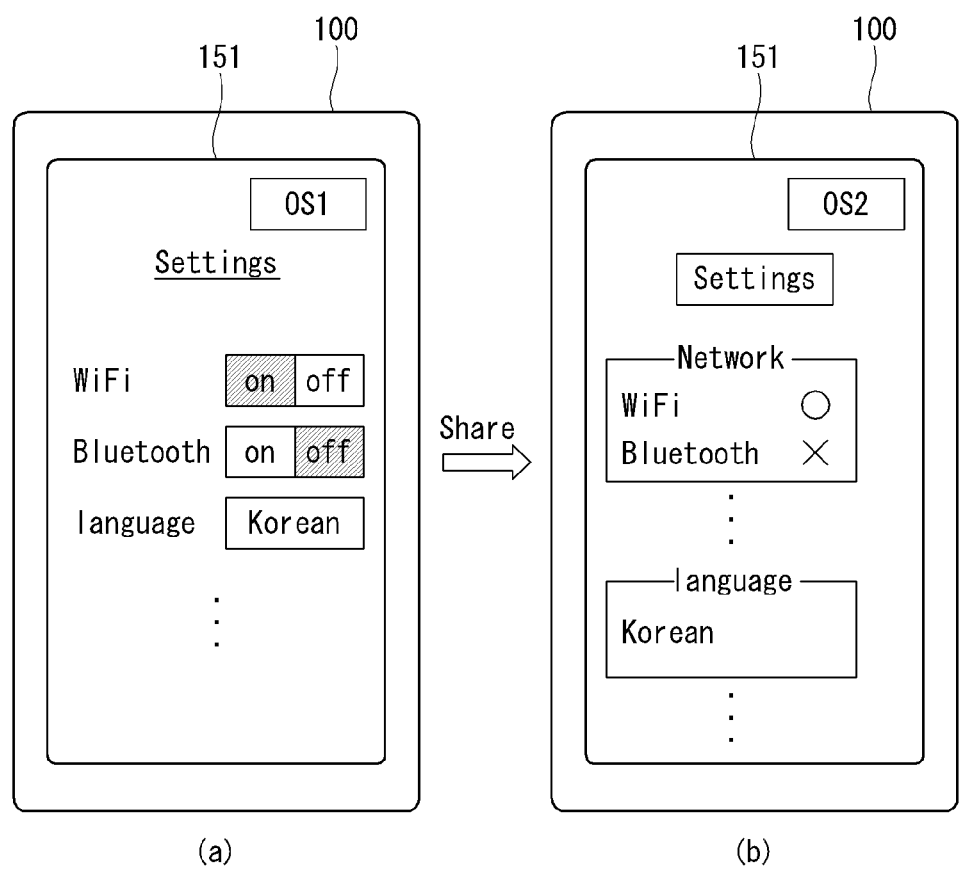
FIGS. 29 to 30 illustrate examples of sharing first application related information in a second application according to the method of sharing information shown in FIG. 28 in a mobile terminal according to an embodiment of the present invention.
Figure 30:
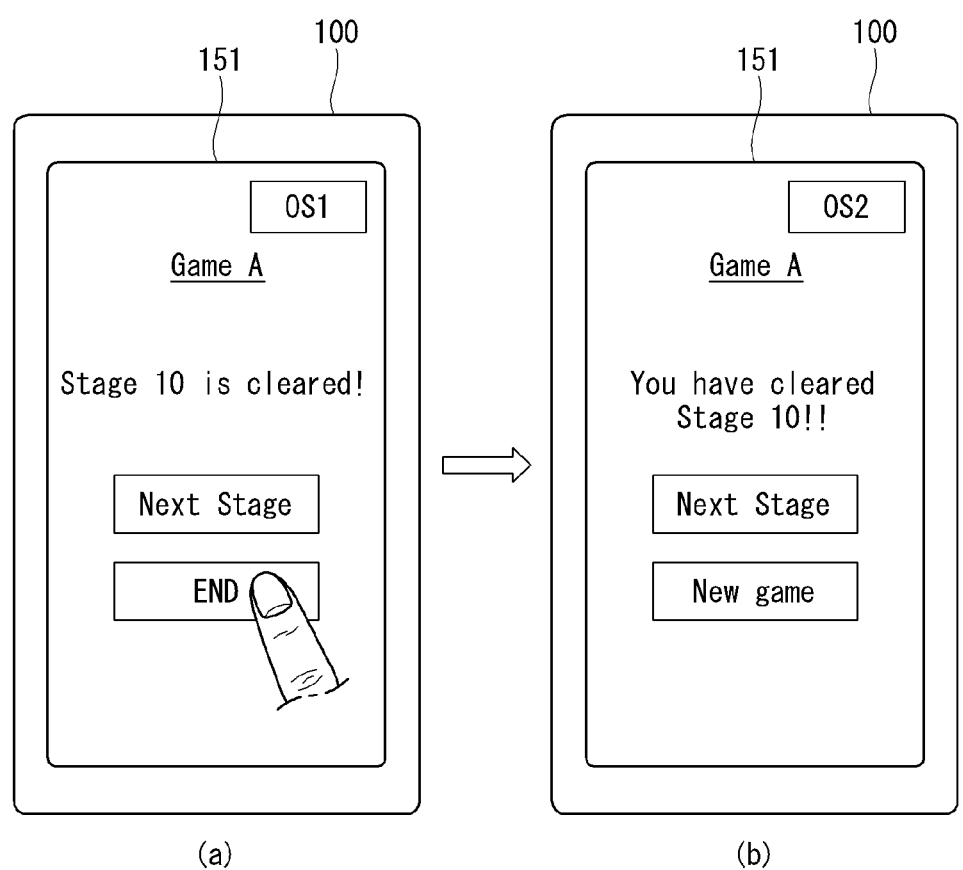

Next, FIGS. 29 to 30 illustrate an example in which first application related information is shared in a second application according to the information sharing method shown in FIG. 28 in the mobile terminal 100 according to an embodiment of the present invention. In more detail, FIG. 29 illustrates an example of sharing setting information of the first application as setting information of the second application.

Referring to FIG. 29(a), the user changes the WiFi connection setting, Bluetooth connection setting, and language setting by executing the first OS setting application. Accordingly, as shown in FIG. 29(b), the controller 180 can change the WiFi connection setting, Bluetooth connection setting, and language setting in the second OS setting application by applying information changed in the first OS setting application to the second OS setting application.

An example in which applications for performing a specific function share setting information will now be described in more detail. The first and second OS phone applications may share setting of a phone number for blocking incoming and outgoing calls, setting of international transmitting call blocking, etc. Further, SNS applications for the first and second OSs may share friend setting or blocked friend setting.

In more detail, FIG. 30 illustrates an example in which the second application shares information generated as an execution result of the first application. Referring to FIG. 30(a), the user executes a game application for the first OS and completes operation of first to tenth steps and then the first OS game application is terminated. Thereafter, when the user executes the same second OS game application as that of the first OS game application in the second OS, as shown in FIG. 30(b), the controller 180 controls the display 151 to display that the user completes operation of first to tenth steps and to display buttons for selecting whether to perform a next step, or to start a new game.

Figure 31:
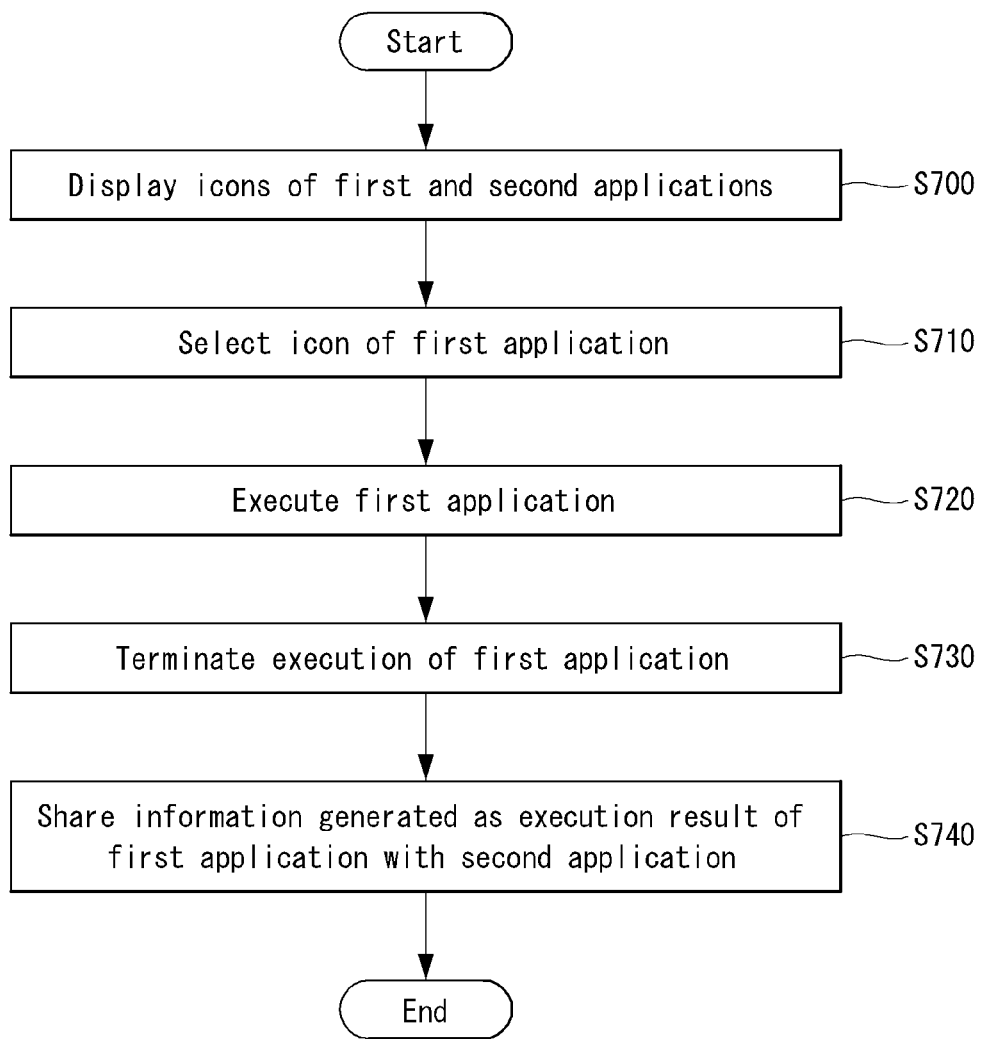
FIG. 31 is a flowchart illustrating an example of a user interfacing method of giving an option to applications for performing the same function in different OSs in a mobile terminal according to an embodiment of the present invention.

FIG. 31 is a flowchart illustrating an example of a user interfacing method of giving an option to applications for performing the same function in different OSs in the mobile terminal 100 according to an embodiment of the present invention. As shown, the controller 180 controls the display 151 to display an icon of the first application for the first OS and an icon of a second application for the second OS for performing the same function as that of the first application (S700). Accordingly, the user can select whether to perform the same function by executing the first application or the second application.

The user selects an icon of the first application (S710). Accordingly, the controller 180 performs a desired function of the user by executing the first application (S720). Thereafter, the user terminates execution of the first application (S730). Thereafter, the controller 180 shares information generated as an execution result of the first application with the second application (S740).

Figure 32:
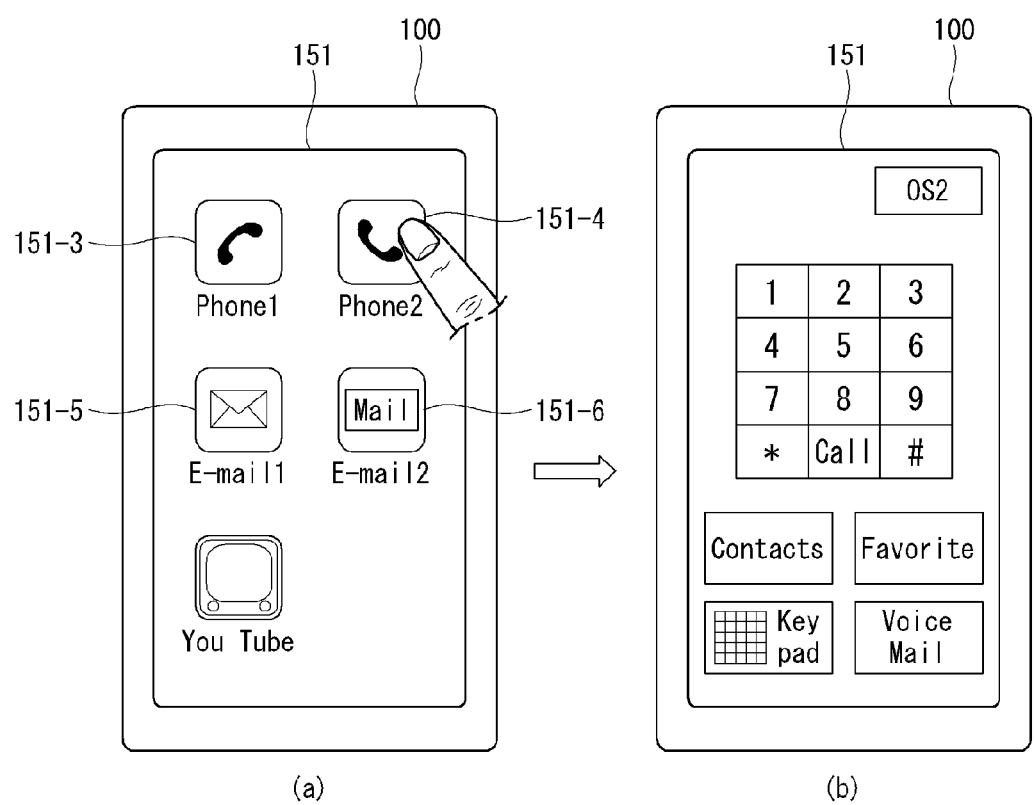
FIG. 32 illustrates an example in which a user executes a phone application according to the user interfacing method shown in FIG. 31.

FIG. 32 illustrates an example in which a user executes a phone application according to a user interfacing method shown in FIG. 31. Referring to FIG. 32(a), the display 151 of the mobile terminal 100 displays icons 151-3 and 151-4 of phone applications for the first and second OSs and icons 151-5 and 151-6 of an e-mail application for the first and second OSs. In a state of FIG. 32(a), the user touches the icon 151-4 of a phone application for the second application. Accordingly, the controller 180 allocates the display 151 to the second OS, and controls the display 151 to display an execution screen of a phone application for the second OS as shown in FIG. 32(b).

In this instance, unlike that shown in FIG. 32(a), when the user touches an icon 151-3 of a phone application for the first OS, the controller 180 may allocate the display 151 to the first OS and control the display 151 to display an execution screen of a phone application for the first OS.

Next, FIG. 33 illustrates another example of a user interfacing method of giving an option to applications for performing the same function in different OSs in the mobile terminal 100 according to an embodiment of the present invention. Unlike FIG. 32(a), in FIG. 33(a), an icon of a phone application is not separated for the first OS and second OS. However, an icon 151-7 of a phone application shown in FIG. 33(a) is a sharing icon of the first OS and the second OS. In a state of FIG. 33(a), the user touches the icon 151-7 of the phone application.

Accordingly, the controller 180 controls the display 151 to display an area 151-8 for the user to select the first OS phone application or the second OS application, as shown in FIG. 33(b). As shown in FIG. 33(b), when the user selects the second OS phone application, the controller 180 controls the display 151 to display an execution screen of the second OS phone application, as shown in FIG. 33(b).

The above-described user interfacing method of the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a storage unit in which a first operating system (OS) and a second OS are loaded;
   a display including a first display area and a second display area; and
   a controller configured to:
      allocate the first OS to the first display area and the second OS to the second display area,
      set up a priority order for operating a plurality of applications,
      display a first operation for a first application related to the first OS on the first display area and a second operation for a second application related to the second OS on the second display area,
      receive a request to perform an action by the second OS, the action related to a specific application of the plurality of applications, and differentiated from the first operation and the second operation,
      transfer execution of the action to the first OS and execute the action using the first OS when the action has a higher priority order than the first operation, and
      execute the action using the second OS when the action has a lower priority order than the first operation, and
      change the first display area from displaying the first operation to displaying the action when the action has a higher priority order than the first operation, and
      change the second display area from displaying the second operation to displaying the action when the action has a lower priority order than the first operation.

2. The mobile terminal of claim 1, wherein the controller is further configured to selectively execute the action and allocate at least a portion of the first display area based on a type of at least one of the first operation executing on the first OS and the action.

3. The mobile terminal of claim 2, wherein the controller is further configured to selectively execute the action and allocate at least a portion of the first display area to the action, when an importance of the action is greater than a preset threshold.

4. The mobile terminal of claim 2, wherein when the first OS is in an idle mode, the first operation is displaying an idle screen on the first display area, and
   wherein the controller is further configured to determine the action is more important than the first operation when the first operation is displaying the idle screen.

5. The mobile terminal of claim 2, further comprising:
   a communication unit configured to form a communication network with an external device,
   wherein the controller is further configured to output an execution result of the first operation to the external device.

6. The mobile terminal of claim 5, wherein the controller is further configured to control the first OS to execute the first operation in a background, when outputting the execution result of the first operation to the external device.

7. The mobile terminal of claim 5, wherein the controller is further configured to control the first OS to execute the first operation using input data generated by an input mechanism connected to the communication unit, or to control the external device to execute the first operation using the input data.

8. A mobile terminal comprising:
   a communication unit configured to form a communication network with an external device;
   a storage unit in which a first operating system (OS) and a second OS are loaded;
   a display including a first display area and a second display area; and a controller configured to:
      allocate the first OS to the first display area and the second OS to the second display area,
      set up a priority order for operating a plurality of applications,
      display a first operation for a first application related to the first OS on the first display area and a second operation for a second application related to the second OS on the second display area,
      receive a request to perform an action by the second OS, the action indicating a third application related to the second OS, and differentiated from the first operation and the second operation,
      transfer execution of the action to the first OS and execute the action using the first OS when the action has a higher priority order than the first operation, and execute the action using the second OS when the action has a lower priority order than the first operation,
      change the first display area from displaying the first operation to displaying the action and transfer an output of the first operation to the external device when the action has a higher priority order than the first operation, and
      maintain displaying of the first operation on the first display area and transfer the output of the action to the external device when the action has a lower priority order than the first operation.

9. The mobile terminal of claim 8, wherein the controller is further configured to selectively output an execution result of the first operation to the external device and to display the output of the action based on a type of at least one of the first operation executing on the first OS and the action.

10. The mobile terminal of claim 8, wherein the controller is further configured to control the first OS to execute the first operation in a background, when outputting an execution result of the first operation to the external device.

11. The mobile terminal of claim 8, wherein the controller is further configured to control the first OS to execute the first operation using input data generating by an input mechanism connected to the communication unit, or to control the external device to execute the first operation using the input data.

12. The mobile terminal of claim 1, wherein the controller is further configured to receive a sliding touch input on the second display area in a direction of the first display area, and expand an output result of the second operation on the second display area to the first display area.

13. The mobile terminal of claim 1, wherein the first operation is one of an idle state, a web surfing operation, or an environment setting operation, and the action is one of a call reception, SMS message reception, MMS message reception, and a real time chat reception of an SNS.

* * * * *